United States Patent
Han et al.

(10) Patent No.: US 10,592,468 B2
(45) Date of Patent: Mar. 17, 2020

(54) SHUFFLER CIRCUIT FOR LANE SHUFFLE IN SIMD ARCHITECTURE

(71) Applicant: QUALCOMM Incorporated, San Diego, CA (US)

(72) Inventors: Liang Han, San Diego, CA (US); Xiangdong Jin, Mountain View, CA (US); Lin Chen, San Diego, CA (US); Yun Du, San Diego, CA (US); Alexei Vladimirovich Bourd, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 15/209,057

(22) Filed: Jul. 13, 2016

(65) Prior Publication Data
US 2018/0018299 A1 Jan. 18, 2018

(51) Int. Cl.
| G06F 15/80 | (2006.01) |
| G06F 9/30  | (2018.01) |
| G06F 13/40 | (2006.01) |
| G06F 9/38  | (2018.01) |

(52) U.S. Cl.
CPC ...... *G06F 15/8007* (2013.01); *G06F 9/30032* (2013.01); *G06F 9/30036* (2013.01); *G06F 9/3887* (2013.01); *G06F 13/4013* (2013.01); *G06F 15/80* (2013.01); *G06F 15/8053* (2013.01)

(58) Field of Classification Search
CPC .. G06F 15/8007; G06F 15/8053; G06F 15/80; G06F 9/3887; G06F 13/4013; G06F 9/30032; G06F 9/30036

USPC .......................................................... 712/22
See application file for complete search history.

(56) References Cited

U.S. PATENT DOCUMENTS

| 7,343,389 | B2  | 3/2008  | Macy et al. |
| 8,914,613 | B2  | 12/2014 | Sperber et al. |
| 9,218,182 | B2  | 12/2015 | Ermolaev et al. |
| 2004/0054877 | A1 | 3/2004 | Macy et al. |
| 2009/0172358 | A1 | 7/2009 | Sperber et al. |
| 2010/0106944 | A1* | 4/2010 | Symes ............... G06F 9/30018 712/208 |
| 2013/0339664 | A1* | 12/2013 | Ould-Ahmed-Vall ..................... G06F 9/30018 712/205 |

(Continued)

FOREIGN PATENT DOCUMENTS

GB       2444744 A       6/2008

OTHER PUBLICATIONS

Raghavan, P et al. A Customized Cross-Bar for Data Shuffling in Domain-Specific SIMD Processors. Architecture of Computing Systems, 2007, pp. 57-68 [online], [retrieved Aug. 1, 2018]. Retrieved from the Internet <URL:http://citeseerx.ist.psu.edu/viewdoc/download?doi=10.1.1.95.3430&rep=rep1&type=pdf>.*

(Continued)

*Primary Examiner* — Aimee Li
*Assistant Examiner* — Shawn Doman
(74) *Attorney, Agent, or Firm* — Shumaker & Sieffert, P.A.

(57) ABSTRACT

Techniques are described to perform a shuffle operation. Rather than using an all-lane to all-lane cross bar, a shuffler circuit having a smaller cross bar is described. The shuffler circuit performs the shuffle operation piecewise by reordering data received from processing lanes and outputting the reordered data.

23 Claims, 8 Drawing Sheets

(56) References Cited

U.S. PATENT DOCUMENTS

| | | | |
|---|---|---|---|
| 2013/0339682 A1* | 12/2013 | Uliel | G06F 9/30032 |
| | | | 712/226 |
| 2014/0059323 A1 | 2/2014 | Fridman et al. | |
| 2014/0149480 A1 | 5/2014 | Catanzaro et al. | |
| 2014/0208067 A1* | 7/2014 | Bradbury | G06F 9/30007 |
| | | | 712/7 |
| 2015/0039851 A1 | 2/2015 | Uliel et al. | |

OTHER PUBLICATIONS

International Search Report and Written Opinion—PCT/US2017/033663—ISA/EPO—Aug. 9, 2017.
Response to Written Opinion from corresponding PCT Application Serial No. PCT/US2017/033663 filed on Sep. 15, 2017 (20 pages).
International Preliminary Report on Patentability from corresponding PCT Application Serial No. PCT/US2017/033663 dated Sep. 13, 2018 (19 pp).

* cited by examiner

FIG. 4A SHUFFLE ROTATE-DOWN, OFFSET = 1

FIG. 4B SHUFFLE ROTATE-DOWN, OFFSET = 2

FIG. 4C SHUFFLE ROTATE-DOWN, OFFSET = 3

FIG. 4D SHUFFLE ROTATE-UP, OFFSET = 1

FIG. 4E SHUFFLE ROTATE-UP, OFFSET = 2

FIG. 4F SHUFFLE ROTATE-UP, OFFSET = 3

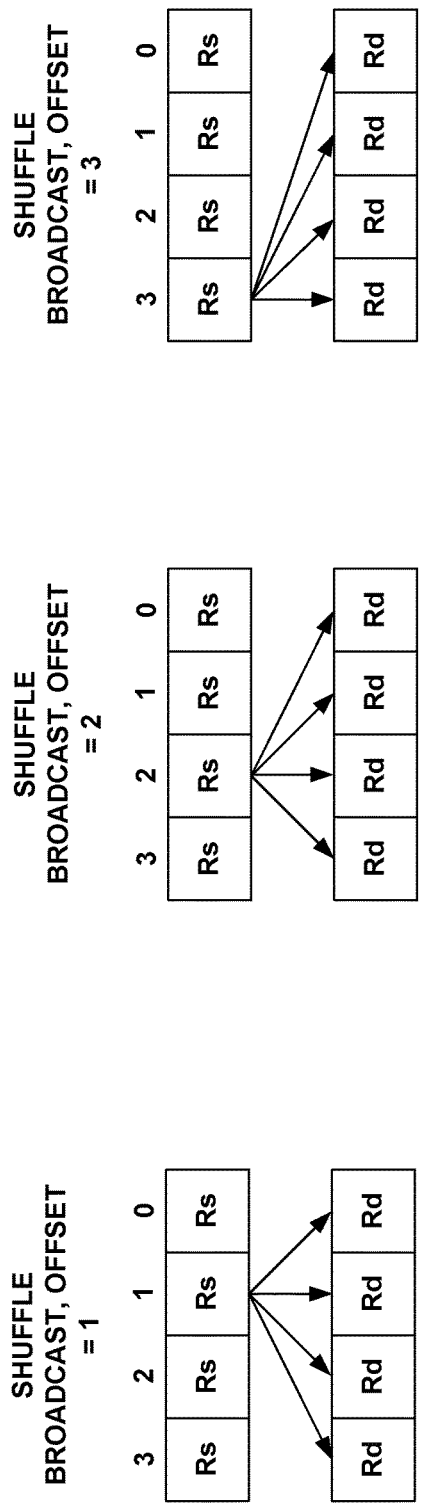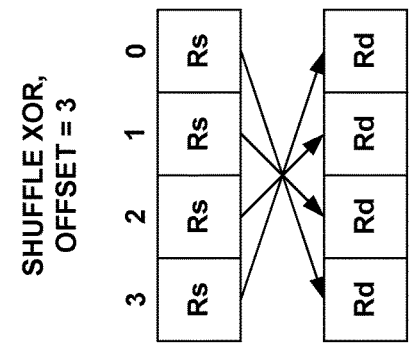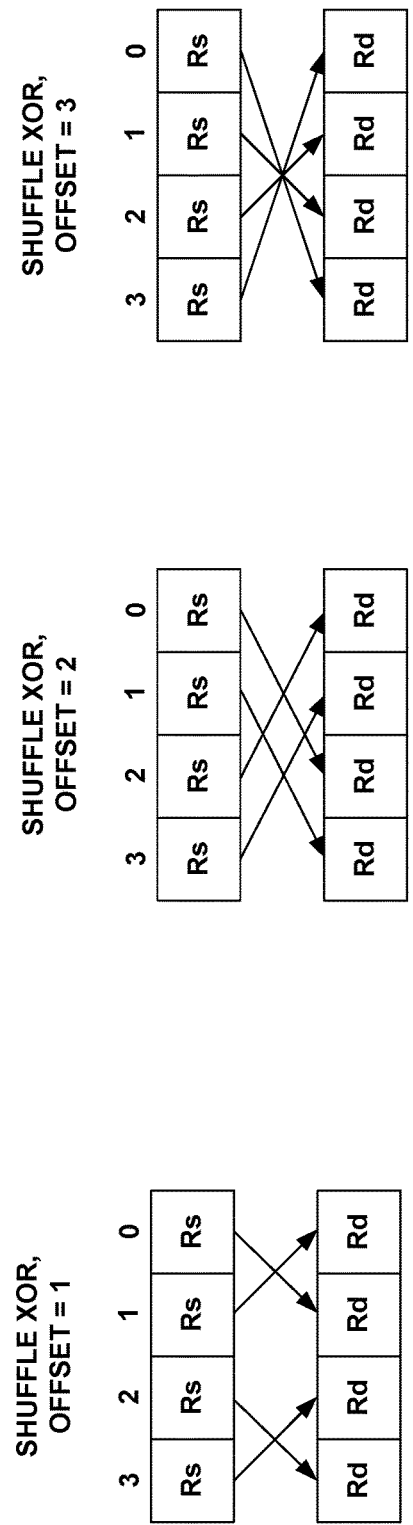

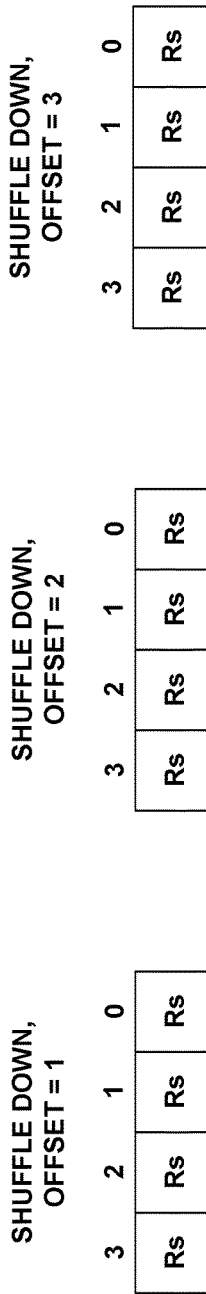
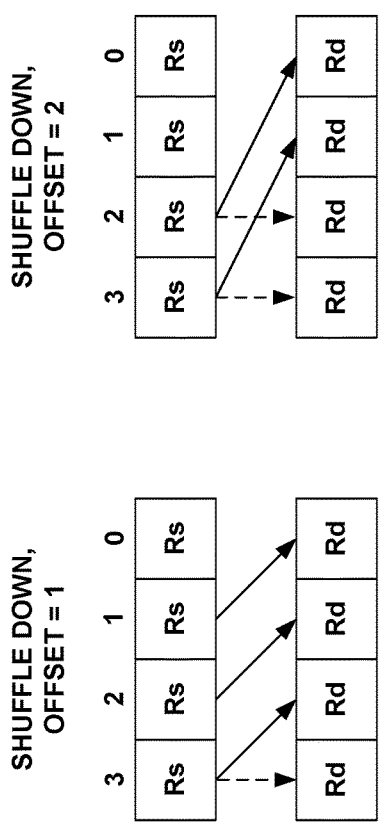
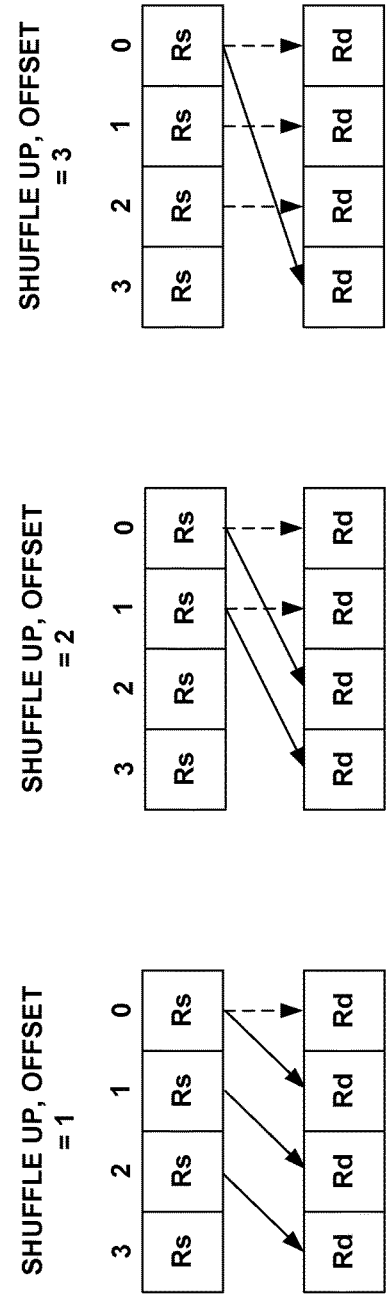
FIG. 4M
FIG. 4N
FIG. 4O
FIG. 4P
FIG. 4Q
FIG. 4R

US 10,592,468 B2

SHUFFLER CIRCUIT FOR LANE SHUFFLE IN SIMD ARCHITECTURE

TECHNICAL FIELD

This disclosure relates to data processing in a single instruction multiple data (SIMD) structure.

BACKGROUND

Various types of processing units, such as graphics processing units (GPUs), are designed with a single instruction multiple data (SIMD) structure. In the SIMD structure, there is a plurality of processing lanes, where each processing lane executes the same instruction, but with different data.

SUMMARY

This disclosure describes example ways of shuffling data between different processing lanes of a processing unit having a SIMD architecture. To perform the shuffle, this disclosure describes a shuffler circuit. The shuffler circuit receives data from a subset of processing lanes (referred to as source subset of processing lanes), performs the shuffle operation across the source lanes (e.g., reorders the data), and outputs the reordered data to the processing lanes. Although all of the processing lanes are sent data from the shuffler circuit, only a subset of processing lanes (referred to as destination subset of processing lanes) may write the reordered data to corresponding registers for storage, and the rest may discard the reordered data. The shuffler circuit may receive data from a successive source subset of processing lanes, reorder the received data, and successive destination subsets of processing lanes may able to write the reordered data to corresponding registers.

In this way, the shuffler circuit may shuffle data piecewise on a subset of the data. Utilizing a shuffler circuit that shuffles data piecewise, as described in this disclosure, allows for data shuffle without needing physical connections between each processing lane, which would require additional circuit space and increase power consumption when shuffling data.

In one example, the disclosure describes a device for processing data, the device comprising a plurality of processing lanes, each of the processing lanes comprising circuitry to process the data, wherein the processing lanes are configured in a single instruction multiple data (SIMD) structure and a shuffler circuit. The shuffler circuit is configured to receive data from a source subset of the processing lanes, reorder the data received from the source subset of the processing lanes responsive to an instruction instructing at least some of the processing lanes to output data to another one of the processing lanes, and output the reordered data to the processing lanes, wherein a destination subset of the processing lanes stores the reordered data in corresponding registers, and wherein the processing lanes other than the destination subset of the processing lanes discard the received reordered data.

In one example, the disclosure describes a method of processing data, the method comprising receiving, with a shuffler circuit, data from a source subset of processing lanes of a plurality of processing lanes, each of the processing lanes comprising circuitry to process the data, wherein the processing lanes are configured in a single instruction multiple data (SIMD) structure, reordering, with the shuffler circuit, the data received from the source subset of the processing lanes responsive to an instruction instructing at least some of the processing lanes to output data to another one of the processing lanes, and outputting, with the shuffler circuit, the reordered data to the processing lanes, wherein a destination subset of the processing lanes stores the reordered data in corresponding registers, and wherein the processing lanes other than the destination subset of the processing lanes discard the received reordered data.

In one example, the disclosure describes a device for processing data, the device comprising means for receiving data from a source subset of processing lanes of a plurality of processing lanes, each of the processing lanes comprising circuitry to process the data, wherein the processing lanes are configured in a single instruction multiple data (SIMD) structure, means for reordering the data received from the source subset of the processing lanes responsive to an instruction instructing at least some of the processing lanes to output data to another one of the processing lanes, and means for outputting the reordered data to the processing lanes, wherein a destination subset of the processing lanes stores the reordered data in corresponding registers, and wherein the processing lanes other than the destination subset of the processing lanes discard the received reordered data.

In one example, the disclosure describes a computer-readable storage medium comprising instructions that when executed cause one or more circuits of a device for processing data to receive data from a source subset of processing lanes of a plurality of processing lanes, each of the processing lanes comprising circuitry to process the data, wherein the processing lanes are configured in a single instruction multiple data (SIMD) structure, reorder the data received from the source subset of the processing lanes responsive to an instruction instructing at least some of the processing lanes to output data to another one of the processing lanes, and output the reordered data to the processing lanes, wherein a destination subset of the processing lanes stores the reordered data in corresponding registers, and wherein the processing lanes other than the destination subset of the processing lanes discard the received reordered data.

The details of one or more examples are set forth in the accompanying drawings and the description below. Other features, objects, and advantages will be apparent from the description, drawings, and claims.

BRIEF DESCRIPTION OF THE DRAWINGS

FIGS. 4A-4R are conceptual diagrams illustrating various examples of shuffle modes.

DETAILED DESCRIPTION

Figure 1:
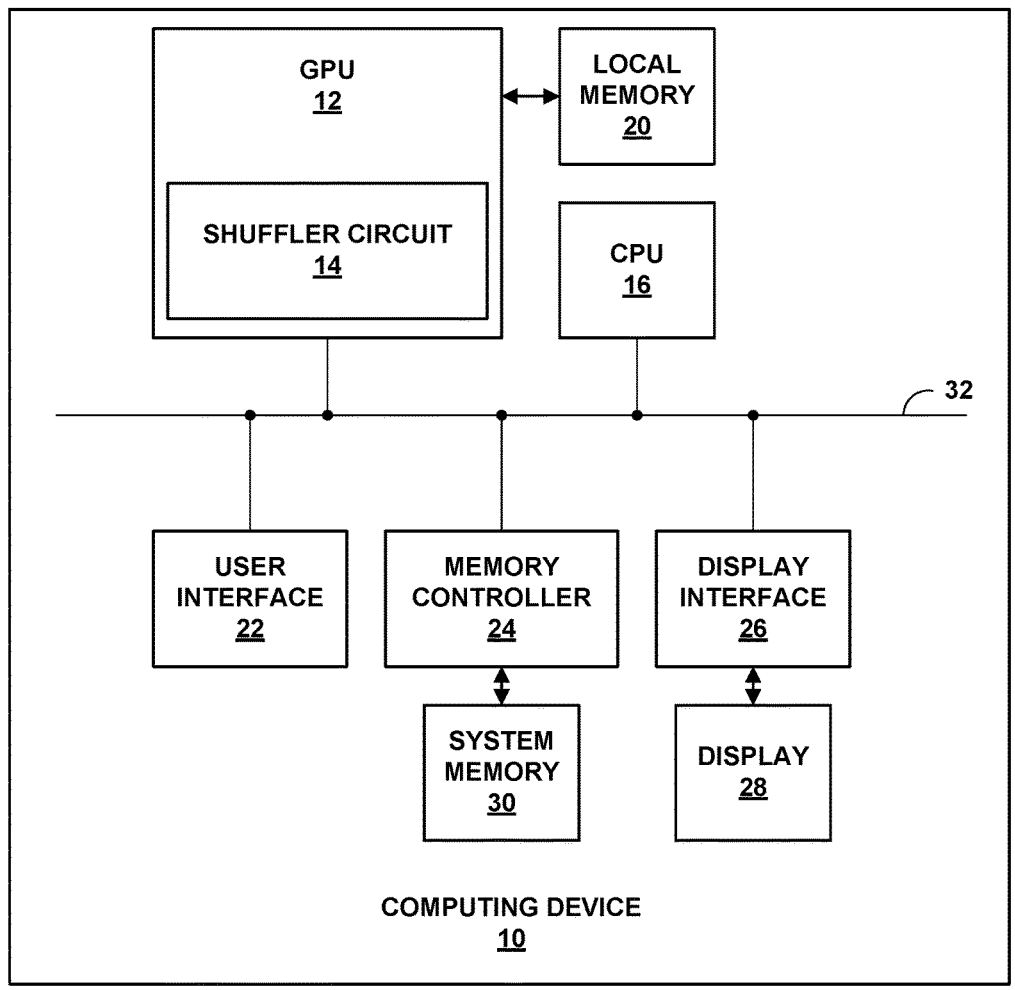
FIG. 1 is a block diagram of a device for image processing configured to perform one or more example techniques described in this disclosure.

In a single instruction multiple data (SIMD) architecture such as that of a graphics processing unit (GPU), there exists a plurality of processing lanes. Each processing lane is performing operations of the same instruction, but on different data. In some cases, processing lanes may output data to be consumed by another processing lane, in what is referred to as shuffle. One example of the shuffle is that each processing lane receives the data from its left neighboring processing lane. One way to allow any one processing lane to output to any other processing lane is via a full all-lane to all-lane crossbar (e.g., electrical connection from a processing lane to all other processing lanes), which is very expensive for chip area and power consumption. Also, as there is an increase in processing lanes, the cost of such a full all-lane to all-lane crossbar increases quadratically.

This disclosure describes example techniques to implement lane shuffle without the need for a full all-lane to all-lane crossbar. The device having the SIMD structure (e.g., the GPU) includes a shuffler circuit that receives data from fewer processing lanes than the total number of processing lanes (e.g., if there are 64 processing lanes, the shuffler circuit receives data from 8 processing lanes at a time). This shuffler circuit receives the data from a subset of source processing lanes (less than the total number of processing lanes), performs shuffle on the data (e.g., reorders the data between the lanes), and outputs the reordered data to all the processing lanes. However, only a subset of the processing lanes may write the reordered data to corresponding registers for storage, and the rest of the processing lanes may discard the received reordered data. The shuffler circuit repeats these steps for successive source subset of processing lanes and successive destination subset of processing lanes that are able to write the reordered data to respective corresponding registers.

For example, each of the processing lanes may write data to and receive data from corresponding registers. A destination subset of the processing lanes stores the reordered data in corresponding registers, which means that the reordered data is actually stored in the corresponding registers. The processing lanes other than the destination subset of the processing lanes discard the received reordered data, which means that the processing lanes may try and store the data in their corresponding registers; however, the corresponding registers may not actually store the data.

In this disclosure, the processing lanes storing the reordered data in corresponding registers means that the processing lanes can successfully store the reordered data in corresponding registers or that the processing lanes are configured to store the reordered data in corresponding registers. The processing lanes discarding the reordered data means that the processing lanes were unsuccessful in storing the reordered data in corresponding registers and that no further action will taken on the data or that the processing lanes are configured not to store the reordered data in corresponding registers.

The shuffler circuit may utilize multiple iterations to complete the shuffle operation because data from only a subset of the processing lanes is being reordered at each given time (i.e., each iteration). However, because each processing lane does not need to be coupled to each of the other processing lanes, the size and power consumption of the GPU may be reduced.

Although the example techniques are described with respect to a GPU, the techniques are not so limited. The techniques may be applicable to various types of processing units, and generally to a processing unit that includes a single instruction multiple data (SIMD) structure.

FIG. 1 is a block diagram of a device for image processing configured to perform one or more example techniques described in this disclosure. Examples of device 10 include a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a tablet computer, a personal music player, a video player, a display device, a camera device, a television, a television set-top box, a server, an intermediate network device, a mainframe computer or any other type of device that processes and/or displays graphical data.

As illustrated in the example of FIG. 1, device 10 includes a central processing unit (CPU) 16, a graphical processing unit (GPU) 12 and local memory 20 of GPU 12, user interface 22, memory controller 24 that provides access to system memory 30, and display interface 26 that outputs signals that cause graphical data to be displayed on display 28. GPU 12 is illustrated as including shuffler circuit 14. As described in this more detail, shuffler circuit 14 may be configured to perform operations of a shuffle instruction that GPU 12 is to execute. Although shuffler circuit 14 is illustrated as internal to GPU 12, in some examples, shuffler circuit 14 may external to GPU 12. In this description, for ease, shuffler circuit 14 is described as being internal to GPU 12.

In some examples, shuffler circuit 14 may be between a core of GPU 12 and a load/store unit of GPU 12. The load/store unit of GPU 12 connects to both local memory 20 and system bus 32. This allows shuffler circuit 14 to possibly be reused for other purposes such as to swizzle data before storing data into, or after loading data from, local/global memory. The location of shuffler circuit 14 between the core of GPU 12 and the load/store unit of GPU 12 is provided merely as one example and should not be considered limiting.

To ease with understanding, the example techniques are described with respect to GPU 12. However, the example techniques are not limited to GPU 12 and may be applicable to other components such as CPU 16 or memory controller 24. In general, the techniques described in this disclosure may be applicable to processing units that includes two or more processing lanes. GPU 12 is used for illustration purposes because GPUs tend to include many processing lanes. However, GPUs are not the only type of processing unit that includes two or more processing lanes.

Also, although the various components are illustrated as separate components, in some examples, the components may be combined to form a system on chip (SoC). As an example, CPU 16, GPU 12, and display interface 26 may be formed on a common chip. In some examples, one or more of CPU 16, GPU 12, and display interface 26 may be in separate chips.

The various components illustrated in FIG. 1 may be formed in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as (e.g., random access memory (RAM), static RAM (SRAM), dynamic RAM (DRAM), erasable programmable ROM (EPROM), electrically erasable programmable ROM (EEPROM), flash memory, a magnetic data media or an optical storage media).

The various units illustrated in FIG. 1 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

CPU 16 may comprise a general-purpose or a special-purpose processor that controls operation of device 10. A user may provide input to computing device 10 to cause CPU 16 to execute one or more software applications. The software applications that execute on CPU 16 may include, for example, an operating system, a word processor application, an email application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 22.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 34 is illustrated in the example computing device 10 of FIG. 1 as being a processing module that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by CPU 16 and GPU 12. For example, system memory 30 may store user applications, resulting images from GPU 12, etc. System memory 30 may additionally store information for use by and/or generated by other components of computing device 10. For example, system memory 30 may act as a device memory for device 10. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 30 may include instructions that cause CPU 16, GPU 12, and display interface 26 to perform the functions ascribed to these components in this disclosure. Accordingly, system memory 30 may be a computer-readable storage medium having instructions stored thereon that, when executed, cause one or more processors (e.g., CPU 16, GPU 12, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from device 10, and moved to another device. As another example, memory, substantially similar to system memory 30, may be inserted into device 10. In certain examples, a non-transitory storage medium may store data that can, over time, change (e.g., in RAM).

CPU 16 and GPU 12 may store image data, and the like in respective buffers that is allocated within system memory 30. Display interface 26 may retrieve the data from system memory 30 and configure display 28 to display the image represented by the rendered image data. In some examples, display interface 26 may include a digital-to-analog converter (DAC) that is configured to convert the digital values retrieved from system memory 30 into an analog signal consumable by display 28. In other examples, display interface 26 may form part of display 28 or may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

In the example techniques described in this disclosure, GPU 12 may be a specialized hardware circuitry configured to perform graphics operations and in some cases, non-graphics operations as well. GPU 12 is designed with a single instruction, multiple data (SIMD) structure. In the SIMD structure, GPU 12 includes a plurality of SIMD processing lanes, where each SIMD processing lane executes instructions of the same program, but on different data. A particular instruction executing on a particular SIMD processing lane is referred to as a thread. Each SIMD processing lane may be considered as executing a different thread because the data for a given thread may be different; however, the thread executing on a processing lane is the same instruction as the instruction executing on the other processing lanes. In this way, the SIMD structure allows the GPU to perform many tasks concurrently.

Many graphics operations require the same process to be performed in parallel (e.g., rendering pixels). Accordingly, for graphics processing, CPU 16 offloads such graphics processing tasks to GPU 12 to be performed by GPU 12. In some examples, non-graphics operations such as matrix multiplication, even if not for graphics processing, may benefit from execution on GPU 12. Accordingly, in some examples, CPU 16 may offload certain non-graphics operations to GPU 12 as GPU 12 may be better suited to perform such operations.

As an example of graphics processing, for vertex processing, GPU 12 may perform the same tasks for each vertex, but the vertex data for each vertex may be different (e.g., different coordinates, different color values, etc.). The SIMD structure allows GPU 12 to process many vertices in parallel by executing the same instance of a vertex shader on different SIMD processing lanes. In this example, each SIMD processing lane may execute a thread of the vertex shader, where each thread is for one instance of the vertex shader.

A SIMD processing lane includes one or more arithmetic logic units (ALUs), and SIMD processing lane stores the result in one or more general purpose registers (GPRs). A plurality of GPRs is referred to as a general purpose register file (GPRF). The GPRF includes dedicated registers for storing resulting data from one or more SIMD processing lanes. The GPRs may be separate and distinct from local cache or local memory 20 of GPU 12.

Instead of exchanging data via accessing an all-lane shared memory, having processing lanes share and exchange data with one another directly, referred to as lane shuffle, can greatly speed up some parallel algorithm which requires cross-lane data communication, such as reduce and scan (which are standard built-in functions of OpenCL), broadcast, transpose, bitonic sort, Fourier transforms, etc. As one example, to transpose a matrix, ALUs of a processing lane may transmit the value on which the processing lane is operating to ALUs of another processing lane. As another example, to determine how many pixels of a particular color there are, ALUs of processing lanes may output information indicative of the color of pixel on which each processing lane is operating to another processing lane, and through an iterative process, it may be possible to determine how many pixels of that particular color there are. There may be other examples for why lane shuffle is useful and the techniques described in this disclosure are not limited to any of the use cases for lane shuffle.

One way to implement lane shuffle is to selectively interconnect each processing lane to every other processing lane via switching network. Such interconnections that allow for any processing lane to couple to any other processing lane are referred to as a full all-lane to all-lane cross bar. A full all-lane to all-lane cross bar may be very expansive in terms of chip area and require high power consumption. Also, the increase in chip area and power consumption increases quadratically for an increase in processing lanes.

To allow for lane shuffle (e.g., most all types of lane shuffles) without needing an all-lane to all-lane cross bar, this disclosure describes shuffler circuit 14. In some examples, shuffler circuit 14 is a fixed-function hardware circuit that is configured to perform fixed-functions (e.g., is not programmable). However, the example techniques are not limited. In some examples, shuffler circuit 14 may be formed by programmable circuitry on which software/firmware used to perform the example techniques described in this disclosure executes. In this example, the software/firmware may configure shuffler circuit 14 to perform the example operations described in this disclosure. In other examples, shuffler circuit 14 may be formed by a combination of fixed-function hardware circuitry and programmable processing circuitry.

In examples where shuffler circuit 14 is programmable circuitry, system memory 30 may store the instructions that cause shuffler circuit 14 to perform the example techniques described in this disclosure. In such examples, shuffler circuit 14 may be part of the programmable core of GPU 12, and CPU 16 may instruct shuffler circuit 14 to execute the instructions when shuffler circuit 14 is to perform the example techniques described in this disclosure. For example, CPU 16 may provide information to shuffler circuit 14 identifying the memory location within system memory 30 from which shuffler circuit 14 is to retrieve the instructions and provide commands to shuffler circuit 14 to execute the instructions. In any case, for ease of description, this disclosure describes shuffler circuit 14 as a fixed-function circuit.

Rather than interconnecting all processing lanes to one another, shuffler circuit 14 allows for selectively outputting data from a subset of processing lanes (referred to as a source subset of processing lanes). For example, shuffler circuit 14 receives data from M number of processing lanes, reorders the data from the M processing lanes, and outputs the reordered data. In some examples, shuffler circuit 14 may output the reordered data to all processing lanes; however, only a subset of the processing lanes may be able to store the reordered data from shuffler circuit 14 to corresponding registers (referred to as destination subset of processing lanes). Because shuffler circuit 14 reorders data from a subset of the processing lanes, shuffler circuit 14 may utilize multiple clock cycles to complete the transfer of data from processing lanes to one another.

For example, the shuffle operation may be to have each processing lane output data to a processing lane that is a certain number of lanes away. In this case, shuffler circuit 14 may receive and reorder data from a source subset of processing lanes and output the reordered data to possibly all processing lanes. However, only the destination subset of processing lanes that are the certain number of lanes away from a respective source subset of processing lanes may be able to store the reordered data from shuffler circuit 14 into corresponding registers. Shuffler circuit 14 may then repeat these operations with the next source subset of processing lanes. Each of these iterations of receiving data from subsets of processing lanes, reordering the data, and outputting the data is processed through multiple clock cycles.

Each of the processing lanes corresponds to one or more registers of a general purpose register file (GPRF). The processing lanes receive data from and output data to corresponding registers. In the example techniques described in this disclosure, the destination subset of processing lanes may store the reordered data in their corresponding registers, and the other processing lanes may discard the reordered data. For instance, the corresponding registers of the destination subset of processing lanes may be allowed to store the reordered data, while the corresponding registers of the other processing lanes may not be allowed to store the reordered data. A multiplexer (MUX) may be coupled to each of the registers and the MUXes for the registers that correspond to the destination subset of processing lanes allow the reordered data to be stored in corresponding registers, and the MUXes for the registers that do not correspond to the destination subset of processing lanes do not allow the reordered data to be stored in corresponding registers (e.g., so that the processing lanes discard the data). There may be other ways in which to allow corresponding registers to store data or not store data such as configuring the processing lanes to either store the data or not store data (e.g., discard the data).

Processing lanes storing the reordered data means that the reordered data is actually stored in corresponding registers and not just that the processing lanes attempt to store the reordered data. Processing lanes discarding the reordered data means that the reordered data was not stored in corresponding registers. In some examples, the registers may be allowed to store the data or not allowed to store the data. In some examples, the processing lane may be configured to store data or not configured to store the data. In some examples, a combination of the two is possible. Processing lanes storing the reordered data refers to any possibility of these techniques for storing the reordered data. Processing lanes discarding the reordered data refers to any possibility of these techniques for not storing the reordered data.

In this disclosure, source processing lanes and destination processing lanes are all processing lanes of GPU 12. For example, if each processing lane is to output data to a neighboring processing lane, then processing lane five is a source processing lane for processing lane six and processing lane six is a destination processing lane for processing lane five. Also, processing lane five is a destination processing lane for processing lane four and processing lane four is a source processing lane for processing lane five. Accordingly, for the shuffle operation, each processing lane may be a source processing lane for one processing lane and a destination processing lane for another processing lane.

When processing lanes of GPU 12 are to output data to one another, CPU 16 may issue a "shuffle instruction" to GPU 12. In many examples of GPU 12, GPU 12 is self-reactive. This means that CPU 16 and GPU 12 do not cooperate instruction-by-instruction. Rather, CPU 16 sends a whole program to GPU 12 to execute. GPU 12, by itself, fetches/decodes/executes a group of instructions of that program. CPU 16 and GPU 12 exchange input/result data via system memory 30. In this disclosure, CPU 16 issuing a shuffle instruction to GPU 12 means that in the program that CPU 16 instructed GPU 12 to execute includes the shuffle instruction. However, in examples where CPU 16 and GPU 12 cooperate on an instruction-by-instruction basis, CPU 16 may output the shuffle instruction to GPU 12 on an instruction-by-instruction basis.

The shuffle instruction defines a shuffle mode and an offset. The shuffle mode indicates the direction in which processing lanes are to output to which processing lanes (e.g., output data to a processing lane to the left or to the right or to all processing lanes), and the offset is used to determine how far away the processing lane that receives data is from the processing lane that outputs the data. For broadcast mode, which is one example of a shuffle mode, a unique index of the source lane is used to determine the offset for each lane.

In some examples, the offset indicates how far way its source lane is. This is because sometimes not all lanes are active or in the range (e.g., the offset indicates a source lane is outside the range of all available lanes), and some lanes without a valid source lane may be missed out if the offset is based from the source lane. Also, sending data to a non-active or out-of-boundary lane may serve no purpose. Instead, each valid destination lane indicates which one is its source lane so that data is only sent to destination lanes that are valid to receive data. If, however, the source lane is invalid (e.g., non-active or out-of-boundary), by default the destination lane may use itself as a source lane (e.g., perform self-copy where the destination lane copies its own data). In this disclosure, the offset may be considered from either the source lane or the destination lane perspective, with the understanding that in some cases the destination lane may define its source lane based on the offset and in some cases the source lane may define the destination lane based on the offset.

Because of the SIMD structure of GPU 12, the shuffle instruction may apply to each of the processing lanes. Again, each of the processing lanes may execute the same instruction but with different data, and therefore, each processing lane executes the shuffle instruction (e.g., each processing lane is to output data to one other processing lane). As the offset is defined by the shuffle instruction, the offset may be the same for each processing lane (i.e., the offset is uniform for all processing lanes). Although the disclosure describes that each of the processing lanes may execute the same shuffle instruction, in some examples, it may be possible that at least some, but not necessarily all, of the processing lanes execute the same shuffle instruction.

If the offset is such that it causes a processing lane to output to an out of boundary processing lane, then the offset will cause the processing lane to wrap around the output to a processing lane within the boundary. For example, the shuffle mode and an offset may define that each processing lane is to output to the processing lane immediately to the left (e.g., shuffle mode is shuffle up and offset is equal to one). In this case, the left-most processing lane will output its data to the right-most processing lane (e.g., wrap around).

The wrapping around of the output may occur for shuffle modes referred to as rotate-up/rotate-down mode. However, for normal up/down modes, source processing lanes may perform a self-copy (e.g., the source processing lane and the destination processing lane are the same). In some examples, each destination lane is coupled to a MUX-2. If normal up/down mode where there is not wrap around, then a destination lane configures the MUX to receive data from the shuffler circuit 14 if the source lane is valid, and configures the MUX to receive data from itself if the source lane is invalid because there is no wrap around.

It should be understood that in this disclosure, shuffler circuit 14 outputting the reordered data to the processing lanes means shuffler circuit 14 outputting respective reordered data to respective processing lanes. For instance, the shuffle instruction and offset may define that each processing lane is to output to a processing lane 20 lanes to the left (e.g., shuffle mode is shuffle up and offset is equal to 20). In this example, assume that shuffler circuit 14 includes eight inputs and eight outputs. Shuffler circuit 14 may receive the data from lanes 0-7 where the first input of shuffler circuit 14 receives data from processing lane 0, the second input of shuffler circuit 14 receives data from processing lane 1, and so forth. For reasons described below, shuffler circuit 14 may reorder the received data such that the first output of shuffler circuit 14 outputs data received from processing lane 4, the second output of shuffler circuit 14 outputs data received from processing lane 5, the third output of shuffler circuit 14 outputs data received from processing lane 6, the fourth output of shuffler circuit 14 outputs data received from processing lane 7, the fifth output of shuffler circuit 14 outputs data received from processing lane 0, the sixth output of shuffler circuit 14 outputs data received from processing lane 1, the seventh output of shuffler circuit 14 outputs data received from processing lane 2, and the eighth output of shuffler circuit 14 outputs data received from processing lane 3.

Viewed another way, the first to eighth inputs of shuffler circuit 14 receive data from processing lanes 0-7, respectively. Shuffler circuit 14 then reorders the data, for below reasons, such that the corresponding first to eighth outputs of shuffler circuit 14 output data received from processing lanes 4, 5, 6, 7, 0, 1, 2, and 3, respectively. In this disclosure, when shuffler circuit 14 is described as receiving data from processing lanes or outputting the reordered data to processing lanes, this disclosure is referring to shuffler circuit 14 receiving data from respective processing lanes and outputting respective data to the respective processing lanes.

Also, this disclosure should not be interpreted to mean that there is a specific temporal order in which data from processing lanes is received or outputted. For example, the first to eighth inputs of shuffler circuit 14 should not be interpreted to mean that the first input receives data first, the second input receives data second, and so forth. Although such sequential reception of data is possible, the example techniques are not so limited and the first to eighth inputs of shuffler circuit 14 may receive the data in parallel (e.g., at the same time) or some combination. Similarly, the first to eighth outputs of shuffler circuit 14 should not be interpreted to mean that the first output outputs data first, the second output outputs data second, and so forth. Although such sequential transmission of data is possible, the example techniques are not so limited and the first to eighth outputs of shuffler circuit 14 may output the data in parallel (e.g., at the same time) or some combination. Also, shuffler circuit 14 may include more or fewer than eight inputs and outputs.

In the example techniques described in this disclosure, the processing lanes may be formed as a plurality of banks where each bank includes one or more processing lanes. For example, if there are 64 processing lanes, there may be eight banks, each bank including eight processing lanes. A source subset of processing lanes may be the processing lanes of one bank. For these examples, shuffler circuit 14 receiving data from the source subset of processing lanes may be considered as substantially the same as shuffler circuit 14 receiving data from one bank of the plurality of banks.

In some examples, shuffler circuit 14 may only be able to receive data from one bank at a time. The interconnections between the input of shuffler circuit 14 and the processing lanes may be such that the first input of shuffler circuit 14 may only receive input from respective first processing lanes of each bank, the second input of shuffler circuit 14 may only receive input from respective second processing lanes of each bank, and so forth. If shuffler circuit 14 receives data from the first bank (e.g., respective inputs of shuffler circuit 14 receives data from respective processing lanes of the first bank), then another processing iteration to perform the shuffle operation, shuffler circuit 14 receives data from the second bank (e.g., respective inputs of shuffler circuit 14 receives data from respective processing lanes of the second bank). There may be no interconnection that allows shuffler circuit 14 to receive data from processing lanes in different banks during the same iteration.

After reordering the data, shuffler circuit 14 may output the reordered data to the processing lanes, and in some examples, may output the reordered data to each of the banks. There may an interconnection between each bank and the output of shuffler circuit 14 (e.g., each processing lane of each bank can receive data from one, and possibly only one, output of shuffler circuit 14). For example, the first processing lanes of each respective bank may be configured to receive data from a first output of shuffler circuit 14, the second processing lanes of each respective bank may be configured to receive data from a second output of shuffler circuit 14 and so forth.

When shuffler circuit 14 outputs data, the data is broadcast to all processing lanes. For example, each of first processing lanes in each of the banks receive the first output of shuffler circuit 14, each of the second processing lanes in each of the banks receive the second output of shuffler circuit 14, and so forth.

Because the output of shuffler circuit 14 is broadcast to each of the banks, shuffler circuit 14 reorders the received data. For instance, assume that each processing lane is to output data to a processing lane that is 10 lanes away. Again, for ease, assume that shuffler circuit 14 includes eight inputs and eight outputs, and that each bank includes eight processing lanes. In this example, the source subset of processing lanes includes those of the first bank (e.g., processing lanes 7-0). In this example, assume that the first input receives data from processing lane 0. In this case, the data from processing lane 0 is to be outputted to processing lane 10.

However, the first output of shuffler circuit 14 is not connected to and may not be connectable to processing lane 10. Rather, the first output of shuffler circuit 14 is connected to respective first processing lanes of respective banks. For instance, processing lane 10 may be in the second bank that includes processing lanes 8-15. In this case, the first output of shuffler circuit 14 is coupled to processing lane 8. Therefore, if shuffler circuit 14 did not reorder the input data, the first output of shuffler circuit 14 would output to processing lane 8, and not processing lane 10.

Accordingly, shuffler circuit 14 may reorder the input data such that when the output data is broadcast, the correct processing lane receives the data. In this context, reorder means that shuffler circuit 14 shifts the input data such that the data that respective outputs of shuffler circuit 14 output is different than the data on the corresponding input of shuffler circuit 14. For example, the first output of shuffler circuit 14 does not output the data on the first input of shuffler circuit 14, the second output of shuffler circuit 14 does not output the data on the second input of shuffler circuit 14, and so forth. Instead, shuffler circuit 14 reorders the data such that the respective outputs, which are broadcast, are received by correct destination processing lanes. The destination processing lanes are the processing lanes to which the data is to be outputted (e.g., outputting the data of processing lane 0 to processing lane 10, where processing lane 10 is the destination processing lane and processing lane 0 is the source processing lane).

Shuffler circuit 14 may reorder the input data based on a modulo function. For example, processing circuitry within shuffler circuit 14 or a controller circuit of GPU 12 or some other circuitry may divide the offset by the number of input/outputs of shuffler circuit 14 and determine a remainder of the division. Shuffler circuit 14 may shift each input left or right with wraparound based on the remainder. The output of shuffler circuit 14 may output this shifted-wraparound data (e.g., reordered data).

Although there may not be interconnection between all processing lanes (e.g., no all-lane to all-lane cross bar) in GPU 12, each of the inputs of shuffler circuit 14 may be selectively coupled to any of the outputs of shuffler circuit 14. For example, shuffler circuit 14 may include a plurality of switches that allow any input to be coupled to any output. Processing circuitry within shuffler circuit 14 or a control signal from another circuit (e.g., a controller circuit of GPU 12) may selectively toggle close and open switches to couple the intended inputs and outputs of shuffler circuit 14 to reorder the data.

As an example of how the remainder identifies how much to shift the data on the input to reorder, assume, as above, that each processing lane is to output to a processing lane that is 10 lanes away (e.g., offset equals 10). The number of inputs/outputs of shuffler circuit 14 is eight, and 10/8 equals one with a remainder of two. In this example, shuffler circuit 14 may toggle its internal switches such that each input is shifted to its left by two with wrap around. For instance, if the input to shuffler circuit 14 is processing lanes 0-7 of bank 0, then the first to eighth input of shuffler circuit 14 is the data from processing lanes 0-7, respectively.

Shuffler circuit 14 shifts the input data based on the remainder of two such that the third output of shuffler circuit 14 outputs the data on the first input of shuffler circuit 14, the fourth output of shuffler circuit 14 outputs the data on the second input of shuffler circuit 14, and so forth. Due to the wraparound, the first output of shuffler circuit 14 outputs the data on the seventh input of shuffler circuit 14 and the second output of shuffler circuit 14 outputs the eighth input of shuffler circuit 14.

In this example, the order of the input data (e.g., data on the first to eighth input) is data from processing lanes 0-7, respectively. After reordering, the order of the output data (e.g., data on the first to eighth output) is data from processing lanes 6, 7, 0, 1, 2, 3, 4, and 5, respectively.

As described above, processing lane 10 is to receive the data of processing lane 0 because the offset is 10. Processing lane 10 is in bank 1 that includes processing lanes 8-15. Because the output of shuffler circuit 14 is broadcast to each bank and each processing lane in each bank is coupled to a respective output of shuffler circuit 14, the first processing lane of bank 1 receives the data from the first output of shuffler circuit 14, the second processing lane of bank 1 receives the data from the second output of shuffler circuit 14, and so forth. In this example, the first output of shuffler circuit 14 outputs the data of processing lane 6 which the first processing lane (e.g., processing lane 8) of bank 1 receives. The second output of shuffler circuit 14 outputs the data of processing lane 7 which the second processing lane (e.g., processing lane 9) of bank 1 receives.

Then, the third output of shuffler circuit 14 outputs the data of processing lane 0 which the third processing lane (e.g., processing lane 10) of bank 1 receives. As can be seen, in this example, processing lane 10 received the data from processing lane 0 due to reordering of the data. This pattern holds for the remaining lanes of banks 1 (e.g., processing lane 11 receives the data from processing lane 1, processing lane 12 receives the data from processing lane 2, and all the way to processing lane 15 receives the data from processing lane 5). So far, processing lanes 10-15 received data from processing lanes 0-5.

However, processing lanes 16 and 17 are to also receive the data from processing lanes 6 and 7, respectively. Processing lanes 16 and 17 belong in bank 2, which includes processing lanes 16-23. Processing lane 16 is the first processing lane in bank 2 and processing lane 17 is the second processing lane in bank 2. As described above, the output of shuffler circuit 14 is broadcast to each bank. Therefore, processing lane 16 receives the first output of shuffler circuit 14 and processing lane 17 receives the second output of shuffler circuit 14. In this example, the first output of shuffler circuit 14 is the data of processing lane 6 and the second output of shuffler circuit 14 is the data of processing lane 7. By shifting and wrapping around the data on the input (e.g., reordering the data), the data of processing lane 6 is outputted to the processing lane that is 10 processing lanes away (e.g., processing lane 16), and the same holds for processing lane 7 being outputted to processing lane 17.

In the above example, the data from processing lanes 0-7 were to be outputted to processing lanes 10-17. However, after the reordering, while processing lanes 10-17 correctly received data from processing lanes 0-7, respectively, various processing lanes received data from processing lanes that are not 10 lanes away. For instance, in the above example, processing lane 8 received data from processing lane 6, and processing lane 6 is not 10 processing lanes away.

To address this issue, only the destination subset of processing lanes (e.g., those that are to receive data) may store the received reordered data. For example, the controller circuit of GPU 12 may allow the GPRs of processing lanes 10-17 to store data when processing lanes 0-7 are the input lanes (e.g., configure a MUX coupled to GPRs corresponding to processing lanes 10-17 to allow the GPRs to store the data). The GPRs of the rest of the processing lanes may not be allowed to store data (e.g., configure a MUX coupled to GPRs corresponding to the rest of the processing lanes to not allow the GPRs to store the data), and thereby discard the data. Therefore, although the data is broadcast, the data is not written to GPRs any of the unintended processing lanes.

Shuffler circuit 14 may then receive the input of the next successive bank (e.g., bank 0 which includes processing lanes 8-15). Shuffler circuit 14 may similarly reorder the data based on the remainder (e.g., shift two and wraparound so the output order is 14, 15, 8, 9, 10, 11, 12, and 13) and broadcast the output to the processing lanes (e.g., to each bank). The controller circuit may allow the GPRs of processing lanes 18-25 to store the data, and not allow the GPRs of the other processing lanes to store the data. Shuffler circuit 14 and the controller circuit may repeat these operations until all source processing lanes have their output written to respective destination processing lanes.

In the above example, the controller circuit is described as allowing or not allowing corresponding GPRs to be able to store data as one way in which destination subset of processing lanes store data or discard data. In some examples, the controller circuit may allow the processing lanes to store the data or not store data as a way for the processing leans to store data or discard data. A combination of such techniques is also possible.

Accordingly, FIG. 1 provides an example of a device for processing data, where the device includes GPU 12. GPU 12 includes a plurality of processing lanes where each of the processing lanes includes circuitry to process the data (e.g., ALUs) and the processing lanes are configured in a SIMD structure. GPU 12 also includes shuffler circuit 14 that receives data from a source subset of the processing lanes (e.g., from processing lanes of a bank). Shuffler circuit 14 reorders the data received from the source subset of the processing lanes based on an instruction (e.g., from CPU 16) instructing each of the processing lanes to output data to another one of the processing lanes. Shuffler circuit 14 outputs the reordered data to the processing lanes (e.g., the output is broadcast to banks). In some examples, a destination subset of the processing lanes stores the received reordered data in corresponding registers and the processing lanes other than the destination subset of processing lanes discard the received reordered data.

In the above example, the data that shuffler circuit 14 receives may be the entire scalar or vector values for each processing lane of the source subset of the processing lanes. For instance, the data that shuffler circuit 14 is receiving may not be sub-bytes of the entire data, but rather is the entire scalar or vector value. Shuffler circuit 14 may also be configured to reorder the entire scalar or vector values received from each processing lane of the source subset of processing lanes, and may output the entire scalar or vector values of the reordered data to the processing lanes.

Also, the above describes that in the shuffle operation, one processing lane outputs its data to another processing lane. In some examples, the data a processing lane outputted to another processing lane is still maintained with the processing lane. Each processing lane maintains its own data and receives data from another processing lane. In some examples, the data generated by the processing lane itself may be deleted and only the data received from another processing lane may be maintained.

Figure 2:
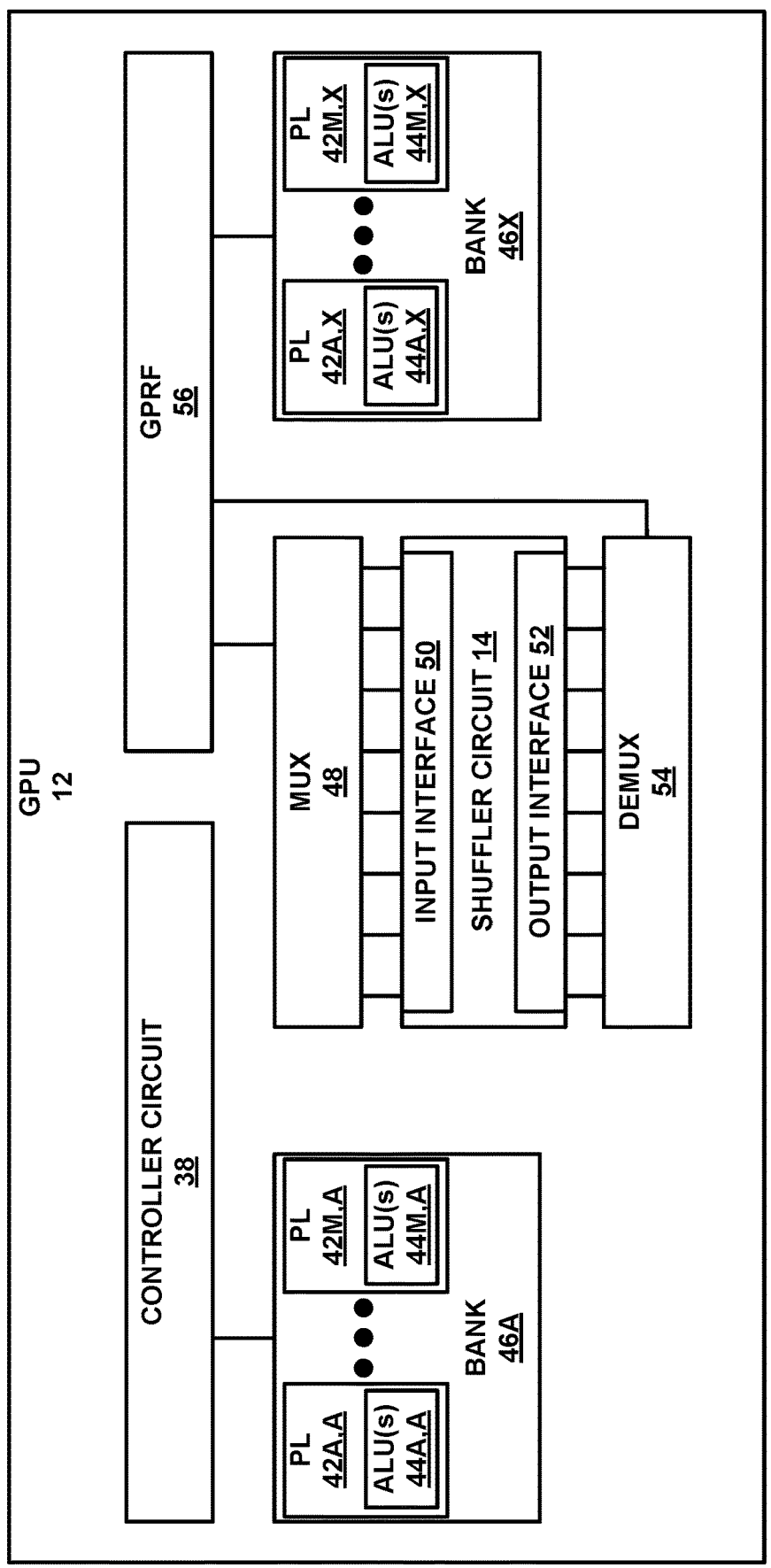
FIG. 2 is a block diagram illustrating one example of a GPU of FIG. 1 in greater detail.

FIG. 2 is a block diagram illustrating one example of a GPU of FIG. 1 in greater detail. For instance, FIG. 2 illustrates one example of processing circuitry of GPU 12. GPU 12 includes controller circuit 38, shuffler circuit 14, and general purpose register file (GPRF) 56. As also illustrated, GPU 12 includes a plurality of banks 46A-46X. Each of the plurality of banks 46A-46X includes a plurality of processing lanes (PLs). For example, bank 46A includes processing lanes 42A,A to 42M,A, and bank 46X includes processing lanes 42A,X to 42M,X. Accordingly, in FIG. 2, processing lanes (e.g., 42A,A to 42M,A or 42A,X to 42M,X) are grouped into a plurality of banks 46A-46X and each bank of the plurality of banks 46A-46X includes one or more processing lanes of the plurality of processing lanes.

As an example, assume that there are a total of 64 processing lanes. In this example, there are eight banks and each bank includes eight processing lanes. Accordingly, banks 46A-46X represent the eight banks, PL 42A,A to 42M,A represents the eight processing lanes of bank 46A and PL 42A,X to 42M,X represents the eight processing lanes of bank 46X.

Each of processing lanes 42A,A to 42M,X includes one or more ALUs 44A,A to 44M,X, respectively. ALUs 44A,A to 44M,X may be configured to perform the processing tasks that are assigned to each one of processing lanes 42A,A to 42M,X. In this disclosure, ALUs 44A,A to 44M,X may be part of a processing core (also referred to as shader core) of GPU 12. For example, GPU 12 may be configured to execute instructions of a shader program (e.g., vertex shader, pixel shader, geometry shader, or a compute shader used for non-graphics applications). Each of the processing lanes 42A,A to 42M,X may execute an instruction of the shader program parallel but the data may be different (e.g., there are multiple instantiations of the shader program). ALUs 44A,A to 44M,X may be the hardware circuitry that perform the operations defined by the instruction.

Although the disclosure describes that each of the processing lanes may execute the same instruction, in some examples, it may be possible that at least some, but not necessarily all, of the processing lanes execute the shuffle instruction. For instance, a subset of processing lanes 42A,A to 42M,X may execute the same instruction in parallel, and the others may not. In such examples, it may be possible that at least some of processing lanes 42A,A to 42M,X are executing a shuffle instruction in parallel and others are not.

GPRF 56 is the memory allocated for processing lanes 42A,A to 42M,X to store locally generated data. For example, GPRF 56 includes a plurality of general purpose registers (GPRs) that are assigned to processing lanes 42A,A to 42M,X. Each one of ALUs 44A,A to 44M,X may retrieve data from respective assigned GPRs for processing (e.g., operand data for processing), perform mathematical operations on the data based on the instruction of the shader program being processed, and output the resulting data back to respective assigned GPRs.

In some examples, shuffler circuit 14 is coupled, and in some examples selectively coupled, to the GPRs of processing lanes 42A,A to 42M,X. In this way, shuffler circuit 14 receives data from a source processing lane via the GPR of that source processing lane and outputs data to a destination processing lane by outputting data to the GPR of that destination processing lane. Accordingly, the shuffle operation may be performed with shuffler circuit 14 receiving data from GPRs of source processing lanes and outputting data to GPRs of destination processing lanes.

As a basic example, if the instruction is to add values represented by variables A and B, then each one of processing lanes 42A,A to 42M,X receives this add instruction. ALUs 44A,A to 44M,X retrieve the value for variable A from respective GPRs in GPRF 56 and retrieve the value for variable B from respective GPRs in GPRF 56. In this example, the value of variables A and B may be different for processing lanes 42A,A to 42M,X, but the instruction to add A and B is the same. Respective ALUs 44A,A to 44M,X may perform the mathematical operation of adding to generate respective result data represented by the variable C and may store the value of C in respective GPRs in GPRF 56. Then, if further operations are needed where variable C is an operand, respective ALUs 44A,A, to 44M,X retrieve the data from respective GPRs of GPRF 56 for processing.

Controller circuit 38 may control the functionality of GPU 12. Controller circuit 38 is described as a hardware component, but may also be the component on which software executes. Accordingly, controller circuit 38 refers to both fixed-function and programmable circuitry.

In examples described in this disclosure, controller circuit 38 may be configured to output the instruction that each one of processing lanes 42A,A to 42M,X is to process. For example, CPU 16 may output a command to GPU 12 to execute a particular shader program. In response, controller circuit 38 may be configured to retrieve the instructions of the shader program from system memory 30 and schedule each one of processing lanes 42A,A to 42M,X to execute instructions of the shader program.

In the example techniques described in this disclosure, controller circuit 38 may receive an instruction that instructs each one of processing lanes 42A,A to 42M,X to output its data to another one of processing lanes 42A,A to 42M,X (e.g., controller circuit 38 receives a shuffle instruction). The shuffle instruction may define a shuffle mode (e.g., the direction in which each one of processing lanes 42A,A to 42M,X is to output its data) and an offset (e.g., a number of processing lanes away that each one of processing lanes 42A,A to 42M,X is to output its data). For example, the instruction may define the shuffle mode as a shuffle rotate-up (also called shuffle left) where each one of processing lanes 42A,A to 42M,X is to output its data to a processing lane located on the left. The offset may be 10, meaning that each one of processing lanes 42A,A to 42M,X is to output data to a processing lane that 10 lanes to its left. If there is no lane that is 10 lanes to the left, the offset wraps around.

In this disclosure, one lane being to the left or right of another lane may mean that the lanes are physically located to the left or right within the SIMD architecture of GPU 12. However, in some examples, one lane being left or right of another lane may be a logical designation. For instance, lanes having smaller addresses than current lane may be considered as being on the right, and lanes having larger addresses than current lane may be considered as being on the left. Therefore, the terms left and right should not be considered as limiting to physical locations of the lanes, but in some examples, the left and right may be referring to the literal location of the lanes in the SIMD architecture of GPU 12.

As described above, shuffler circuit 14 is configured to reorder data so that processing lanes 42A,A to 42M,X can perform their respective shuffle operation. To perform the shuffle operation, shuffler circuit 14 receives data from a source subset of processing lanes 42A,A to 42M,X. For example, shuffler circuit 14 may receive data from processing lanes of one bank, and may not receive data from processing lanes that span more than one bank (e.g., receive data from processing lanes 42A,A to 42M,A of bank 46A).

To allow shuffler circuit 14 to receive data from processing lanes from one bank, shuffler circuit 14 may be coupled to multiplexer (MUX) 48, and MUX 48 may be coupled to each of banks 46A-46X. For example, MUX 48 includes a first group of inputs to receive the data from processing lanes 42A,A to 42M,A of bank 46A, a second group of inputs to receive the data from processing lanes of the next bank, and so forth, including a group of inputs to receive the data from processing lanes 42A,X to 42M,X of bank 46X. Controller circuit 38 may output a command to MUX 48 instructing MUX 48 to select one of the groups of inputs (e.g., one of banks 46A-46X) and output the data from the selected group of inputs (e.g., output the data from processing lanes of one of banks 46A-46X).

Shuffler circuit 14 includes an input interface 50 that receives the output of MUX 48, which may be the data from processing lanes of one of banks 46A-46X. The processing lanes from which input interface 50 is receiving data is referred to as a source subset of processing lanes. Input interface 50 includes a plurality of input ports. For example, if each one of banks 46A-46X includes eight processing lanes, then input interface 50 includes eight input ports, each port configured to receive data from one of the processing lanes of the selected one of banks 46A-46X.

Based on the shuffle mode and offset in the shuffle instruction, controller circuit 38 may output a command to shuffler circuit 14 to selectively toggle (i.e., close and open) switches within shuffler circuit 14 to couple respective input ports to respective output ports to reorder the received data. As illustrated, shuffler circuit 14 includes output interface 52 that includes a plurality of output ports. Each one of the output ports corresponds to each one of the input ports (e.g., the first input port of input interface 50 corresponds to the first output port of output interface 52, and so forth). In the example techniques described in this disclosure, controller circuit 38 may cause the switches of shuffler circuit 14 to close such that data from an input port is not outputted to a corresponding output port, but instead to another one of the output ports. By selectively coupling input and output ports together, shuffler circuit 14 may reorder the data received on input interface 50.

Output interface 52 outputs the reordered data to demultiplexer (DEMUX) 54. As described above, the reordered data is broadcast to each of banks 46A-46X. In the illustrated example, DEMUX 54 may broadcast the data that output interface 52 outputs to banks 46A-46N. For example, DEMUX 54 includes a first group of outputs that output data to processing lanes 42A,A to 42M,A of bank 46A, a second group of outputs that output data to processing lanes of the next bank, and so forth including a group of outputs that output data to processing lanes 42A,X to 42M,X of bank 46X. In some examples, the first output of each of the groups of outputs of DEMUX 54 is coupled a first processing lane of each of banks 46A-46X, the second output of each of the groups of outputs of DEMUX 54 is coupled to a second processing lane of each of banks 46A-46X, and so forth. In this way, each one of banks 46A-46X receives the output of shuffler circuit 14.

However, in some cases, not all processing lanes are to actually process the received data. Accordingly, controller circuit 38 may allow only a subset of the processing lanes to store the output from shuffler circuit 14 in corresponding GPRs. The processing lanes that are store the reordered data in corresponding GPRs are referred to as a destination subset of the processing lanes. The other processing lanes may discard the received reordered data.

In the example techniques described in this disclosure, shuffler circuit 14 performs piecewise shuffle. For instance, shuffler circuit 14 may first output the data from processing lanes 42A,A to 42M,A of bank 46A (e.g., source subset of processing lanes) to the correct processing lanes (e.g., destination subset of the processing lanes) by reordering the data on the input of shuffler circuit 14 based on the offset and by selectively enabling the destination subset of the processing lanes to receive the data. As described above, one example way to reorder the data on the input is to shift and wraparound the data on the input based on a remainder of dividing the offset with the number of input or output ports of shuffler circuit 14. Shuffler circuit 14 may then repeat these operations with the next bank (e.g., bank 46B) and so forth until bank 46X.

Accordingly, shuffler circuit 14 may utilize multiple clock cycles (N clock cycles) to perform the entire shuffle operation. N equals the total number of processing lanes divided by the number of input or output ports of shuffler circuit 14. Let W equal the total number of processing lanes and M equal the number of input or output ports of shuffler circuit 14. In this case, N equals W/M.

In some cases, when designing shuffler circuit 14, shuffler circuit 14 may be designed to include a certain number of input and output ports based on the desired latency in performing the shuffler operation. For example, in multi-stage pipeline implemented shuffle (such as the examples described in this disclosure), N should be equal to the latency of the bottlenecking stage. Shuffler circuit 14 may use four cycles to read all operands (e.g., data) from the processing lanes, then use N cycles to perform the shuffle between lanes, and then use eight cycles to write-back the results. In this example, N should be eight because the write-back is the bottleneck. Based on how many cycles are needed to perform the shuffle operation, the number of input and output ports shuffler circuit 14 may be calculated by dividing the total number of processing lanes with the number of cycles needed to perform the shuffle operation (e.g., M equals W/N).

It should be understood that it is not necessary to have 4-cycles for read and 8-cycles for write. In general, the number of cycles needed for read and write is determined by bus width. To forward 32 lanes*32-bit data, a wide bus (e.g., 1024-bit) may use one-cycle, or a narrow bus (e.g., 256-bit) may use 4 cycles. Furthermore, at the receiving side, the logic can have a handling width. Assume that handling width is even narrower, (e.g., 128-bit/cycle). In this example, eight-cycles would be sufficient to write all of the data into GPRs. Wider hardware is always more expansive; so these numbers are the result of performance/cost trade-off. In this read-shuffle-write pipeline, if the write stage uses 8 cycles, shuffler circuit 14 should be as narrow as possible to lower cost, but should not be so narrow that the processing cannot finish in eight-cycles.

In this disclosure, narrow is a relative term referring to the number of parallel processing lanes. For example, shuffler circuit 14 is narrow hardware relative to the number of processing lanes in GPU 12 (e.g., shuffles data for fewer lanes than the number of lanes in GPU 12). By using narrow hardware, shuffler circuit 14 uses more cycles but takes less power to complete.

As an example, assume that there are 128 processing lanes (e.g., W equals 128). In this example, shuffler circuit 14 may need to include only 16 input ports and 16 output ports (e.g., shuffler circuit 14 is a 16-lane width cross bar) so that the shuffle operation can be completed in eight cycles (e.g., 128/16 equals 8).

Even in examples where an all-lane to all-lane cross bar is used, the bottleneck may be the writing of data to the processing lanes. Accordingly, by designing shuffler circuit 14 to be able to perform the shuffle operations within the clock cycles of the bottleneck, the example techniques may not add much latency to the overall system as compared to examples that use the all-lane to all-lane cross bar. For instance, in the all-lane to all-lane cross bar, the shuffle operation may require one clock cycle and the write back may require eight clock cycles. In the above example, shuffler circuit 14 may require eight clock cycles to complete the shuffle operation and eight clock cycles to complete the write back. However, because shuffler circuit 14 performs the shuffle operation while the write back is occurring, the total number of clock cycles may be limited to eight clock cycles, which is the same as the total number of clock cycles needed with the all-lane to all-lane cross bar example.

There may not be much increase in latency with the example techniques described in this disclosure, as compared to the examples where all-lane to all-lane cross bar is used. However, the example techniques may provide a reduction in chip area. For example, comparing with a 64-lane all-lane to all-lane cross bar, the example techniques may save $(64/16)^2$ area (e.g., save 16 times the shuffler area).

Figure 3:
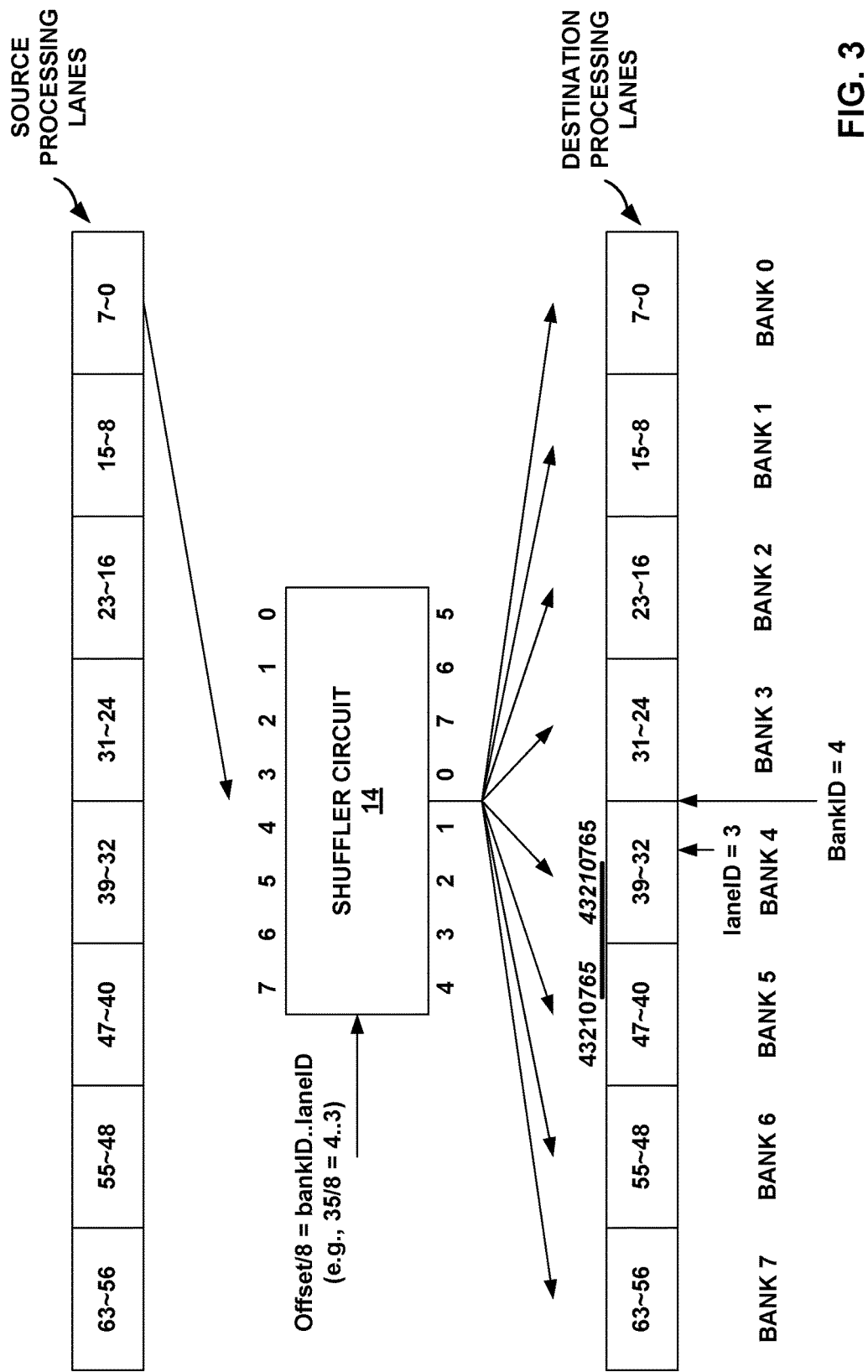
FIG. 3 is a conceptual diagram illustrating an example technique for performing the shuffle operation.

FIG. 3 is a conceptual diagram illustrating an example technique for performing the shuffle operation. FIG. 3 illustrates a plurality of source processing lanes and a plurality of destination processing lanes. The source processing lanes and the destination processing lanes are the same set of lanes. For instance, one lane is a source lane for another lane and a destination lane for another lane (e.g., one lane can be a source lane and a destination lane simultaneously).

In the illustrated example, there are a total of 64 processing lanes (e.g., processing lanes 0-63). There are eight banks (banks 0 to bank 7), each including a plurality of processing lanes. In other words, the 64 processing lanes are grouped into a plurality of banks, each bank of the plurality of banks includes one or more processing lanes. For example, bank 0 includes processing lanes 0-7, bank 1 includes processing lanes 8-15, and so forth. Also, in the illustrated example, shuffler circuit 14 includes eight input ports and eight output ports.

In this example, assume that CPU 16 instructed GPU 12 to perform a shuffle rotate up with an offset of 35 (e.g., processing lane 0 is to output to processing lane 35, processing lane 1 is to output to processing lane 36, and so forth, where processing lane 28 is to output to processing lane 63). For processing lane 29, the offset would cause processing lane 29 to output to processing lane 64, which does not exist. However, the offset wraps around, and processing lane 29 is to output to processing lane 0, processing lane 30 is to output to processing lane 1, and so forth with processing lane 63 outputting to processing lane 34.

In this example, as described above, shuffler circuit 14 may receive the output from a source subset of processing lanes. The processing lanes may be those of one bank (e.g., processing lanes 7-0 of bank 0). Shuffler circuit 14 may receive the data from the processing lanes 7-0 of bank 0 via MUX 48. As illustrated in FIG. 3, each of the input ports of shuffler circuit 14 receives data from one of processing lanes 7-0. For instance, the first input port of shuffler circuit 14 receives data from processing lane 0, the second input port of shuffler circuit 14 receives data from processing lane 1, and so forth.

The data from processing lane 0 is to be outputted to processing lane 35. To ensure that data from processing lane 0 is outputted to processing lane 35, controller circuit 38 may determine which output port of shuffler circuit 14 is coupled to processing lane 35 via DEMUX 54. As described above, DEMUX 54 couples a first processing lane of each bank to a first output port of shuffler circuit 14, a second processing lane of each bank to a second output port of shuffler circuit 14, and so forth. In the example illustrated in FIG. 3, processing lanes 0-7 are coupled to the first through eighth output ports of shuffler circuit 14, respectively, through DEMUX 54, processing lane 8-15 are coupled to the first through eighth output ports of shuffler circuit 14, respectively, through DEMUX 54, and so forth.

To determine which output port of shuffler circuit 14 is coupled to processing lane 35, controller circuit 38 may divide the offset by the number of input/output ports of shuffler circuit 14 (e.g., 35 divided by 8). The quotient of the division indicates the bank in which processing lane 35 is located and the remainder indicates the how many lanes in the processing lane 35 is in the bank. For instance, the quotient of 35 divided by 8 is 4, and the remainder is 3. Therefore, controller circuit 38 may determine that processing lane 35 is in bank 4, and three lanes into bank 4. As illustrated, bank 4 includes processing lanes 32-39, and therefore, processing lane 35 is three lanes into bank 4.

In this example, controller circuit 38 may determine that the data on the respective input ports of shuffler circuit 14 should be shifted by three ports with wraparound so that the output port of shuffler circuit 14 that couples to processing lane 35 receives the data from processing lane 0. For example, the first to eighth output ports of shuffler circuit 14 couple, respectively, to processing lanes 32-39. This means that the fourth output port of shuffler circuit 14 couples to processing lane 35. Therefore, by outputting the data that is on the first input port of shuffler circuit 14 to the fourth output port of shuffler circuit 14, processing lane 35 would receive the data from processing lane 0.

In this case, controller circuit 38 may cause shuffler circuit 14 to interconnect the first input port to the fourth output port so that the data from processing lane 0 is outputted to processing lane 35, to interconnect the second input port to the fifth output port so that the data from processing lane 0 is outputted to processing lane 36, and so forth. For the sixth input port, due to the wraparound, controller circuit 38 may cause shuffler circuit 14 to interconnect the sixth input port to the first output port, to interconnect the seventh input port to the second output port, and interconnect the eighth input port to the third output port.

As illustrated in FIG. 3, the fourth output port receives the data of the first input port (e.g., the fourth output port outputs the data from processing lane 0), the fifth output port receives the data from the second input port (e.g., the fifth output port outputs the data from processing lane 1), and so forth. Accordingly, shuffler circuit 14 may reorder the received data based on the offset. As illustrated, the first output port of shuffler circuit 14 outputs the data from processing lane 5, the second output port of shuffler circuit 14 outputs the data from processing lane 6, the third output port of shuffler circuit 14 outputs the data from processing lane 7, the fourth output port of shuffler circuit 14 outputs the data from processing lane 0, the fifth output port of shuffler circuit 14 outputs the data from processing lane 1, the sixth output port of shuffler circuit 14 outputs the data from processing lane 2, the seventh output port of shuffler circuit 14 outputs the data from processing lane 3, and the eighth output port of shuffler circuit 14 outputs the data from processing lane 4.

DEMUX 54 broadcasts the output of shuffler circuit 14 to each of the banks. As illustrated, processing lanes 32-34 of bank 4 receive the data from processing lanes 5-7, respectively. Processing lanes 35-39 of bank 4 receive the data from processing lanes 0-4, respectively. Due to broadcast of the output of shuffler circuit 14, processing lanes 40-47 of bank 5 receive the data from shuffler circuit 14. For example, processing lanes 40-42 receive the data from processing lanes 5-7, respectively. Processing lanes 43-47 receive the data from processing lanes 0-4, respectively.

In this case, processing lanes 35-39 correctly received the data from processing lanes 0-4 (e.g., because the offset is 35, processing lanes 35-39 are to receive the data from processing lanes 0-4). However, processing lanes 32-34 received the data from processing lanes 5-7, but processing lanes 32-34 were to receive the data from processing lanes 61-63 (due to the wraparound). Similarly, processing lanes 40-42 correctly received the data from processing lanes 5-7 (e.g., because the offset is 35, processing lanes 40-42 are to receive the data from processing lanes 5-7). However, processing lanes 43-47 received the data from processing lanes 0-4, but processing lanes 43-47 were to receive the data from processing lanes 8-12. In this example, none of banks 0-3, 6, and 7 received the data from the correct processing lanes.

In the techniques described in this disclosure, although a processing lane may receive data, the processing lane may not be active to take the data and write it back to GPRs. Controller circuit 38 may be configured to activate the destination subset of processing lanes that are to receive the reordered data. For example, as described above, processing lanes 40-42 and 35-39 received the data from the correct processing lanes to implement a shuffle with offset of 35 and processing lanes 43-47 and 32-34 did not receive the data from the correct processing lanes to implement a shuffle with offset of 35. In this example, controller circuit 38 may activate only processing lanes 40-42 and 35-39 so that only these processing lanes store data in corresponding GPRs. The rest of the processing lanes may not store data in corresponding GPRs, and rather discard the data (i.e., the data is still broadcast to the rest of the processing lanes, but the rest of the processing lanes cannot store the data in corresponding GPRs and so the data is discarded). The processing lanes may not be able to store the data in corresponding GPRs because the GPRs are not allowed to receive the data or because the processing lanes are configured to not store the data.

Controller circuit 38 may determine which processing lanes are to be activated (e.g., allowed to store their data) based on the offset and number of output ports of shuffler circuit 14. For example, controller circuit 38 determined that processing lane 35 is to receive the data from processing lane 0 based on the remainder of 3 from the division of 35 by 8. In this example, controller circuit 38 may allow processing lane 35 and the following seven processing lanes to store data in their corresponding GPRs. In this example, processing lanes 35-42 are a destination subset of the processing lanes. The data to the remainder of the processing lanes may be discarded.

There may be various ways in which controller circuit 38 may allow processing lanes to store data or not store data. Controller circuit 38 may control a MUX coupled to a GPR to allow the GPR to store data from its corresponding processing lane or not allow the GPR to store data from its corresponding processing lane. Controller circuit 38 may control the processing lanes to allow the processing lanes to store data in corresponding GPR or not store data in corresponding GPR. Some combination is also possible, as well as techniques other than these example techniques. In any of these cases, a destination subset of the processing lanes stores the reordered data in corresponding registers, and the processing lanes other than the destination subset of the processing lanes discard the received reordered data.

For example, controller circuit 38 may control to which GPRs are coupled to shuffle circuit 14. For example, controller circuit 38 may determine which eight destination lanes' destination GPR should be connected to write-back in this cycle. In this way, controller circuit 38 may activate processing lanes (e.g., by providing data to the GPRs for those processing lanes).

In this example, shuffler circuit 14 finished outputting the data from lanes 0-7 to the correct destination subset of processing lanes; however, the rest of the processing lanes remain (e.g., shuffler circuit 14 did not receive and output data from remaining lanes 8-63). Accordingly, shuffler circuit 14 and controller circuit 38 may repeat these steps until the shuffle operation is complete. For example, shuffler circuit 14 receives data from lanes 8-15 and reorders the data such that the first output port outputs the data from processing lane as 13, the second output port outputs the data from processing lane 14, the third output port outputs the data from processing lane 15, the fourth output port outputs the data from processing lane 8, the fifth output port outputs the data from processing lane 9, the sixth output port outputs the data from processing lane 10, the seventh output port outputs the data from processing lane 11, and the eighth output port outputs the data from processing lane 12. This reordered data is broadcast to all of the banks, but only lanes 43-50 are store the received reordered data in corresponding GPRs. In this example, bank 6 that includes lanes 48-55 receives the data from lanes 13, 14, 15, 8, 9, 10, 11, and 12, respectively. Because only lanes 48-50 of bank 6 store the data, lanes 48-50 receive the data from lanes 13-15. Bank 4 that includes lanes 40-47 receives the data from lanes 13, 14, 15, 8, 9, 10, 11, and 12, respectively. Because only lanes 43-47 store the data, lanes 43-47 receive the data from lanes 8-12, respectively.

Therefore, after this iteration, the ALUs of lanes 35-42 received data from lanes 0-7, respectively, and the ALUs of lanes 43-50 receive data from lanes 8-15, respectively. Accordingly, the data from lanes 0-15 has been shuffled left (also called shuffled up) by 35 lanes. Shuffler circuit 14 and controller circuit 38 may repeat these for successive banks to complete the shuffle operation.

In the example of FIG. 3, a device for processing data, such as device 10 that includes GPU 12, GPU 12 itself, or some other device having a SIMD structure, there are a plurality of processing lanes 0-63, each of the processing lanes includes circuitry to process the data (e.g., ALUs 44A,A to 44M,X). As described, the processing lanes are configured in the SIMD structure.

Shuffler circuit 14 may be configured to receive data from a source subset of the processing lanes (e.g., receive data from processing lanes 0-7) on the input ports of shuffler circuit 14 via MUX 48. In some examples, to receive the data from the source subset, shuffler circuit 14 may receive data from only one bank. Shuffler circuit 14 may reorder the data received from the source subset of the processing lanes responsive to an instruction instructing each of the processing lanes to output data to another one of the processing lanes (e.g., shuffler circuit 14 may reorder the data responsive to a shuffle instruction). Shuffler circuit 14 may output the reordered data to the processing lanes. For instance, DEMUX 54 may broadcast the reordered data to the processing lanes. In this way, the reordered data that shuffler circuit 14 outputs is outputted to each of the banks. While all of the processing lanes may receive data from one of the outputs of shuffler circuit 14, controller circuit 38 may allow only the destination subset of the processing lanes to store the reordered data in corresponding registers. The other processing lanes may discard the received reordered data.

Shuffler circuit 14 and controller circuit 38 may be configured to perform the above example operations for successive source and destination subsets of the processing lanes. For example, shuffler circuit 14 may receive data from successive source subsets of the processing lanes, reorder the data received from the successive source subsets of the processing lanes, and output the reordered data to the processing lanes, where successive destination subsets of the processing lanes store the received reordered data in corresponding registers.

As illustrated in FIGS. 2 and 3, the processing lanes are grouped into a plurality of banks. Controller circuit 38 may determine a bank identification (e.g., bank ID 4 in example of FIG. 3) for one of the plurality of banks 0-7, and a lane identification (e.g., lane ID 3 in example of FIG. 3) of a processing lane (e.g., processing lane 35) within bank 4 having the determined bank identification based on an offset. In this example, controller circuit 38 is configured to allow corresponding GPRs of the destination subset of the processing lanes to store the reordered data based on the determined bank identification and lane identification (e.g., GPRs corresponding to processing lanes 35-39 of bank 4 and processing lanes 40-42 of bank 5 are allowed to store the data).

In general, if the number of processing lanes that shuffler circuit 14 can receive is M, and there are W number of processing lanes, then shuffler circuit 14 may perform the shuffle operation in N cycles, where N=W/M, as described above. Although the example techniques may utilize more cycles as compared to an all-lane to all-lane crossbar, the techniques described in the disclosure should function without large latency for most (e.g., greater than 90%) of the use cases, while providing significant reduction in power and size. For the other 10% of use cases, software may be used to perform the shuffle operation, which results in poorer performance, but only for limited cases.

In the above examples, the shuffle operation occurred over all processing lanes. However, in some examples, the shuffle instruction may define the shuffle operation over a specified width (e.g., over a group but not all of the processing lanes). In such examples, controller circuit 38 may disable ALUs of processing lanes over which the shuffle operations are not to occur. In general, the number of processing lanes may be considered as being reduced. Such reduction in lanes may be useful for certain operations such as shuffle up or down over a few processing lanes and may be to implement a fast matrix transposition.

FIGS. 4A-4R are conceptual diagrams illustrating various examples of shuffle modes. In FIGS. 4A-4R, four processing lanes are illustrated to ease with understanding. These examples can be expanded to any number of processing lanes. In each of FIGS. 4A-4R, the top row is the source processing lanes (e.g., source registers for the source processing lanes) and the bottom row is the destination processing lanes (e.g., destination registers for the destination processing lanes). Also, shuffler circuit 14 is not illustrated for ease.

FIGS. 4A-4C illustrate examples of the shuffle rotate-down (also referred to as shuffle right or shuffle down). In the example illustrated in FIG. 4A, the offset is 1, and therefore, each processing lane outputs to the processing lane to its right. For the first processing lane, there is no processing lane to its right and so the first processing lane outputs to the last processing lane. In this case, if shuffler circuit 14 were used, then controller circuit 38 would cause data on each of the input ports to shift to the right by one, with wraparound. In the example illustrated in FIG. 4B, the offset is 2, and therefore, each processing lane outputs to the processing lane two to its right. For the first and second processing lanes, there are no processing lanes two to their right and so the first processing lane outputs to the second to last processing lane and the second processing lane outputs to the last processing lane. In this case, if shuffler circuit 14 were used, then controller circuit 38 would cause data on each of the input ports to shift to the right by two, with wraparound. In the example illustrated in FIG. 4C, the offset is 3, and therefore, each processing lane outputs to the processing lane three to its right. For the first three processing lanes, there are no processing lanes three to their right and so the first three processing lanes output to the last three processing lanes. In this case, if shuffler circuit 14 were used, then controller circuit 38 would cause data on each of the input ports to shift to the right by three, with wraparound.

In the example illustrated in FIGS. 4A-4C, shuffler circuit 14 may reorder the data based on the shuffle mode and offset. For example, the shuffle mode of shuffle rotate-down indicates that shuffler circuit 14 will shift data on the input ports rightward and the offset (e.g., based on the remainder of the division of the offset and the number of ports of shuffler circuit 14) indicates by how much shuffler circuit 14 will shift the data rightward.

FIGS. 4D-4F illustrate examples of the shuffle rotate-up (also referred to as shuffle left or shuffle up). In the example illustrated in FIG. 4D, the offset is 1, and therefore, each processing lane outputs to the processing lane to its left. For the last processing lane, there is no processing lane to its left and so the last processing lane outputs to the first processing lane. In this case, if shuffler circuit 14 were used, then controller circuit 38 would cause data on each of the input ports to shift to the left by one, with wraparound. In the example illustrated in FIG. 4E, the offset is 2, and therefore, each processing lane outputs to the processing lane two to its left. For the last two processing lanes, there are no processing lanes two to their left and so the last two processing lanes output to the first two processing lanes. In this case, if shuffler circuit 14 were used, then controller circuit 38 would cause data on each of the input ports to shift to the left by two, with wraparound. In the example illustrated in FIG. 4F, the offset is 3, and therefore, each processing lane outputs to the processing lane three to its left. For the last three processing lanes, there are no processing lanes three to their left and so the last three processing lanes output to the first three processing lanes. In this case, if shuffler circuit 14 were used, then controller circuit 38 would cause data on each of the input ports to shift to the left by three, with wraparound.

In the example illustrated in FIGS. 4D-4F, shuffler circuit 14 may reorder the data based on the shuffle mode and offset. For example, the shuffle mode of shuffle rotate-up indicates that shuffler circuit 14 will shift data on the input ports leftwards and the offset (e.g., based on the remainder of the division of the offset and the number of ports of shuffler circuit 14) indicates by how much shuffler circuit 14 will shift the data leftwards.

FIGS. 4G-4I illustrate the broadcast shuffle mode. In these examples, the offset indicates from which processing lane to start the broadcast (i.e., the offset is an index indicating which processing lane to start the broadcast). In some examples, for the broadcast shuffle mode, there may be no offset, and instead a processing lane index may be used. However, it may be possible to use the offset as the processing lane index instead. For instance, in FIG. 4G, the offset is one and therefore the data from the second processing lane is broadcast to all other processing lanes. In FIG. 4I, the offset is two and therefore the data from the third processing lane is broadcast to all other processing lanes. In FIG. 4H, the offset is three and therefore the data from the fourth processing lane is broadcast to all other processing lanes. In each of these examples, shuffler circuit 14 may receive data from the same bank rather than from different banks successively, and may shift the output rightward or leftward and for each iteration increase the amount by which the output is shifted rightward or leftward (due to the wrap around, it may not be crucial which direction, rightward or leftward, shuffler circuit 14 shifts the data). For example, shuffler circuit 14 may shift the data one to the right in a first iteration, and those destination lanes may store the data in corresponding GPRs. Then in the next iteration, shuffler circuit 14 may shift the data two to the right, and those destination lanes may store the data in corresponding GPRs, and so forth.

FIGS. 4J-4L illustrate the example of shuffle XOR. In the shuffle XOR (also referred to as butterfly shuffle), shuffler circuit 14 applies the XOR function bit-by-bit to the offset value and the value of the source processing lane or destination processing lane, based on design. In this example, the description is based on the destination lane identifying the source lane. For example, in FIG. 4J, the offset value is one, which in binary is 01. For the destination lane 0 (i.e., 00), the XOR of 01 (offset) with the value of the destination lane (00) is 01. For instance, the first binary value for both the destination lane and the offset is 0, and the XOR of 0 and 0 is 0. The second binary value for the destination lane is 0 and the second binary value for the offset is 1, and the XOR of 0 and 1 is 1. Therefore, the result is 01. The value 01 is equal to 1, and destination lane 0 receives data from source lane 1.

In FIG. 4J, for destination lane 1 (i.e., 01), the XOR of 01 and offset value of 01 is 00 (i.e., 0), and destination lane 1 receives data from source lane 0. For destination lane 2 (i.e., 10), the XOR of 10 and offset value of 01 is 11 (i.e., 3), and destination lane 2 receives data from source lane 3. For destination lane 3 (i.e., 11), the XOR of 11 and offset value of 01 is 10 (i.e., 2), and destination lane 3 receives data from source lane 2.

In FIG. 4K, the offset value is 2 (i.e., 10 in binary). In FIG. 4K, for destination lane 0 (i.e., 00), the XOR of 00 and offset value of 10 is 10 (i.e., 2), and destination lane 0 receives data from source lane 2. For destination lane 1 (i.e., 01), the XOR of 01 and offset value of 10 is 11 (i.e., 3), and destination lane 1 receives data from source lane 3. For destination lane 2 (i.e., 10), the XOR of 10 and offset value of 10 is 00 (i.e., 0), and destination lane 2 receives data from source lane 0. For destination lane 3 (i.e., 11), the XOR of 11 and offset value of 10 is 01 (i.e., 1), and destination lane 3 receives data from source lane 1.

In FIG. 4L, the offset value is 3 (i.e., 11 in binary). In FIG. 4L, for destination lane 0 (i.e., 00), the XOR of 00 and offset value of 11 is 11 (i.e., 3), and destination lane 0 receives data from source lane 3. For destination lane 1 (i.e., 01), the XOR of 01 and offset value of 11 is 10 (i.e., 2), and destination lane 1 receives data from source lane 2. For destination lane 2 (i.e., 10), the XOR of 10 and offset value of 11 is 01 (i.e., 1), and destination lane 2 receives data from source lane 1. For destination lane 3 (i.e., 11), the XOR of 11 and offset value of 11 is 00 (i.e., 0), and destination lane 3 receives data from source lane 0.

FIGS. 4M-4O illustrate the shuffle down mode. The shuffle down mode is similar to the shuffle rotate down-mode of FIGS. 4A-4C. However, in shuffle down mode, there is no wraparound. For example, in FIG. 4M, the offset is one, and therefore each destination lane receives data from a source lane one to its left. For destination lane 3, there is no source lane one to its left. Because there is no wraparound, destination lane 3 performs a self-copy and receives data from itself (e.g., the source lane for destination lane 3 is source lane 3). Although not illustrated in FIG. 3, each of the destination lanes may include a MUX, where if the destination lane is to perform self-copy, the MUX does not output data received from a source lane, and if the destination lane is to receive data from a source lane, the MUX outputs the data from the source lane.

In FIG. 4N, the offset is two, and therefore each destination lane receives data from a source lane two to its left. For destination lanes 3 and 2, there are no source lanes two to their left. Because there is no wraparound, destination lanes 3 and 2 perform a self-copy and receive data from themselves (e.g., the source lane for destination lane 3 is source lane 3 and the source lane for destination lane 2 is source lane 2). In FIG. 4O, the offset is three, and therefore each destination lane receives data from a source lane three to its left. For destination lanes 3, 2, and 1, there are no source lanes three to their left. Because there is no wraparound, destination lanes 3, 2, and 1 perform a self-copy and receive data from themselves (e.g., the source lane for destination lane 3 is source lane 3, the source lane for destination lane 2 is source lane 2, and the source lane for destination lane 1 is source lane 1).

FIGS. 4P-4R illustrate the shuffle up mode. The shuffle up mode is similar to the shuffle rotate down-mode of FIGS. 4D-4F. However, in shuffle up mode, there is no wraparound. For example, in FIG. 4P, the offset is one, and therefore each destination lane receives data from a source lane one to its right. For destination lane 0, there is no source lane one to its right. Because there is no wraparound, destination lane 0 performs a self-copy and receives data from itself (e.g., the source lane for destination lane 0 is source lane 0). As described above, each of the destination lanes may include a MUX to allow for such self-copy.

In FIG. 4Q, the offset is two, and therefore each destination lane receives data from a source lane two to its right. For destination lanes 0 and 1, there are no source lanes two to their right. Because there is no wraparound, destination lanes 0 and 1 perform a self-copy and receive data from themselves (e.g., the source lane for destination lane 0 is source lane 0 and the source lane for destination lane 1 is source lane 1). In FIG. 4R, the offset is three, and therefore each destination lane receives data from a source lane three to its right. For destination lanes 0, 1, and 2, there are no source lanes three to their right. Because there is no wraparound, destination lanes 0, 1, and 2 perform a self-copy and receive data from themselves (e.g., the source lane for destination lane 0 is source lane 0, the source lane for destination lane 1 is source lane 1, and the source lane for destination lane 2 is source lane 2).

Although in FIGS. 4M-4R, there is no wraparound, it should be understood that shuffler circuit 14 may wraparound data internally as needed to allow for the shuffle operation to complete. For shuffle up/down, there is no wraparound, but instead self-copy if the source lane is invalid (e.g., out-of-boundary lane). There is no out-of-bound case for shuffle.xor (XOR mode) and shuffle.idx (index or broadcasting mode). However, if there are any inactive lanes for XOR mode, then shuffler circuit 14 performs self-copy. For broadcast and XOR shuffle modes, there is no wraparound. For shuffle rotate-down/up, there is wraparound for the out-of-bounds case.

The following is pseudo-code for implementing the examples illustrated in FIGS. 4A-4R. The pseudo code represents code that may be executable by GPU 12 or by shuffler circuit 14 to perform some examples of techniques described in this disclosure. As an example, the pseudo code may be part of a shader application executing on GPU 12 that calls out the shuffle operation that shuffler circuit 14 is to perform. The syntax in the pseudo-code is shfl.md[.w][.dt] dst, src0, src1. Also, the following uses the term "fibers" which is synonymous with processing lane.

To exchange data among fibers within a wave. Data is copied from src0 GPR in source fiber to dst GPR in executing fiber. The source fiber is calculated from source fiber offset (src1) according to shuffle mode (md).

```
md:      shuffle mode = [ xor | up | down | rup | rdown ]
         rup rdown represents rotate-up rotate-down
[dt]:    data type = [ u16 | u32 ];                    //u32 by default
         shfl doesn't care real data type. It only distinuuishes 16-bit or 32-bit.
         All 16-/32-bit data types are treated as u16/u32. No type casting needed.
[w]:     width = [w4|w8].
         Shuffle within groups of 4 or 8 fibers if w is specified.
         Shuffle within the whole wave (width=wave_size) if w is not specified.
         "width > offset" has to be guaranteed by compiler or assembler
dst.     destination GPR to hold the data
src0:    source GPR to hold the data
src1:    source fiber offset. This value has to be uniform per wave.
         Can be an immediate number (IMM) or a GPR ID
         if IMM:
            is a 5-bit number ranged in 0-31 for wavesize of 32
            is a 6-bit number ranged in 0-63 for wavesize of 64
            is a 7-bit number ranged in 0-127 for wavesize of 128
         if GPR ID:
            uGPR is preferred
            if GPR is used, values in this GPR in all fibers has to be same
HW logic description for wavesize of 64.
nput [1:0] mode = md;                        //shuffle mode
input [5:0] offset = src1;                   //source fiber ID or fiber ID offset (0..63)
input [7:0] src = src0;                      //source register address
input [7:0] dst = dst;                       //dest register address
input is Active [0:63] = get_active_mask( );
wire [5:0] srcFid;
wire [31:0] srcData [0:63];
wire srcValid [0:63];
wire srcInRange [0:63];
input [5:0] Fid = get_fiber_id( );
input [5:0] minFid = 0;
input [5:0] maxFid = get_wave_size( ) – 1;
if(width is defined) {
   minFid = Fid & ~ (width−1);
maxFid = minFid | (width−1);
}
//(1) read out value from source register if that fiber is active
if (isActive[Fid] ) {
   srcData[Fid] = GPR[Fid][src];
   srcValid[Fid] = 1;
} else {
   srcData[Fid] = xxx; //old state value
   srcValid[Fid] = 0;
}
//(2) shuffle - calculate source fiber ID and tell if it is in range
switch (mode) {
   case .idx:              srcFid = offset ;
                              srcInRange = (minFid <=srcFid <= maxFid);
                              break;
   case .xor:              srcFid = Fid ^ offset;
                              srcInRange = 1;   break;
                              srcInRange = (srcFid <= maxFid);   break;
   case .up:               srcFid = Fid − offset;
                              srcInRange = (srcFid >= minFid);   break;
   case .down:             srcFid = Fid + offset;
                              srcInRange = (srcFid <= maxFid);   break;
   case .rotate-up:        srcFid = minFid | (Fid − offset) & (width−1);
                              srcInRange = 1;   break;
   case .rotate-down:      srcFid = minFid | (Fid + offset) & (width−1);
                              srcInRange = 1;   break;
}
//(3) write data into dst GPR for active fibers
if(isActive(Fid)) {
  //copy data from source fiber if it is in range and active
  if (srcInRange[Fid] && srcValid[srcFid])
     GPR[Fid][dst] = srcData [srcFid];
  //otherwise, copy from own fiber
  else
     GPR[Fid][dst] = GPR[Fid][src];
}
```

Figure 5:
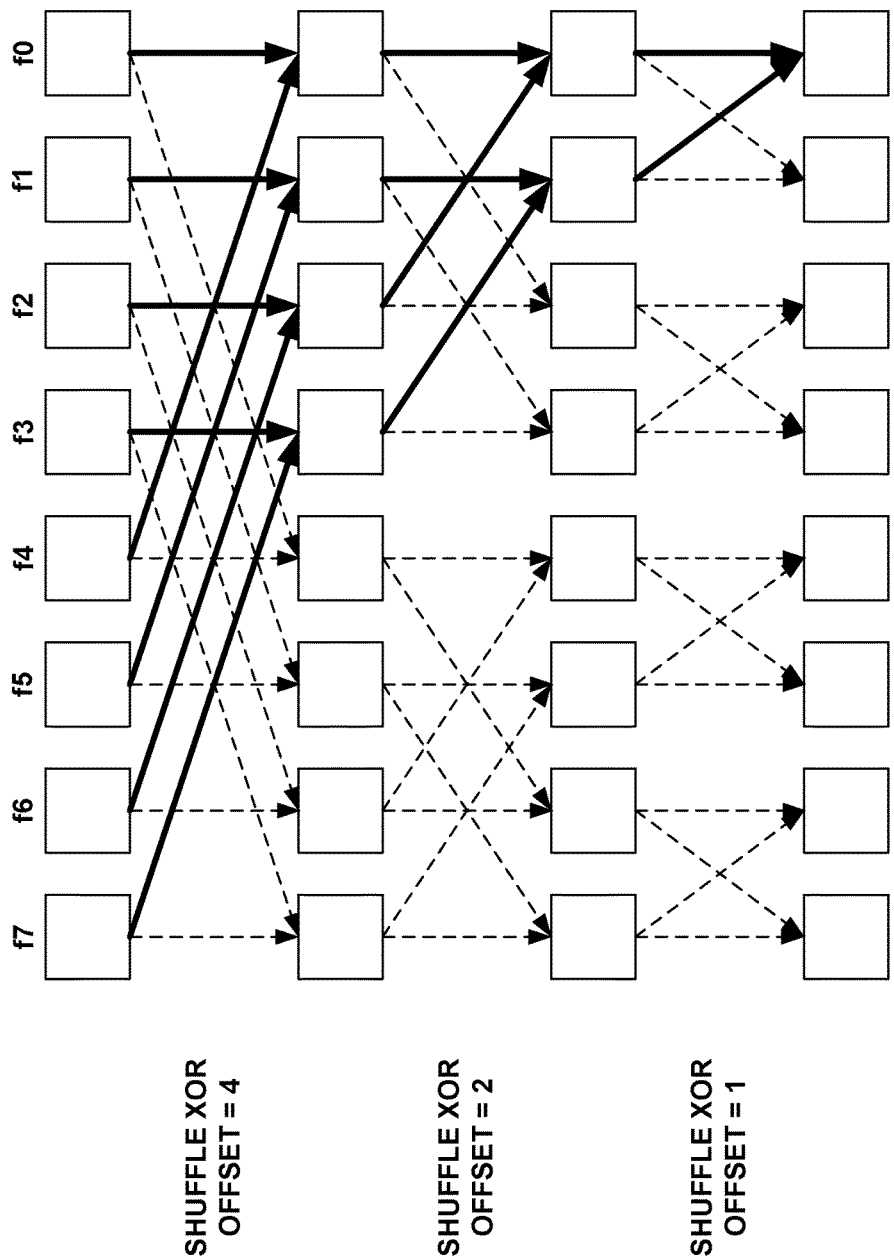
FIG. 5 is a conceptual diagram illustrating operations used with shuffle instructions.

FIG. 5 is a conceptual diagram illustrating operations used with shuffle instructions. The shuffle instruction may conform to a particular API, such as the OpenGL API. One example of the shuffle instruction is: shuffle.mode.datatype rDest rSrc laneOffset. In this example, shuffle.mode.datatype indicates if shuffle up, shuffle down, shuffle broadcast, or shuffle XOR is performed, and the datatype (also referred to as datawidth) indicates the data is 16- or 32-bit. Shuffler circuit 14 may receive, reorder, and output the entire scalar or vector values of each processing lane rather than a small byte. The rDest indicates the destination registers of the corresponding processing lanes to which the data is to be stored and the rSrc indicates the source registers of the corresponding processing lanes from which the data is retrieved. The laneOffset indicates the offset.

As an example, in response to the shuffle instruction in the program being executed by GPU 12, GPU 12 may perform the operations of a shuffle instruction such as shfl.bfly.b32 Ry, Rx, 0x4. In this example, the processing lanes are to perform the XOR shuffle where the values from the Rx register of the source processing lane are stored in the Ry register of the destination processing lane with the offset equal to 4. This operation is illustrated in FIG. 5 with the shuffle XOR offset=4. The bolded diagonal arrows are arrows used to highlight the process, and the dashed diagonal arrows are used to indicate that the process is occurring on the other processing lanes as well. In this example, the values from the Rx registers of source processing lanes are outputted to the Ry registers of destination processing lanes. This means that the values stored in the Rx registers for each processing lane are still available, as illustrated in FIG. 5 with the straight arrows pointing downward. The bolded straight arrows highlight the process, and the dashed straight arrows are used to indicate that the processing is occurring on the other processing lanes as well.

The ALUs of the processing lanes may then perform the following operation: add.f32 Rx, Ry, Rx. In this example, the ALUs of the processing lanes each add the value in respective Rx registers with values from respective Ry registers and store the result in respective Rx registers. Because the value in the Ry register came from the Rx register of another processing lane, the add operation may be considered as each ALU adding the data values from two processing lanes.

Next, each processing lane may perform the following operation: shfl.bfly.b32 Ry, Rx, 0x2. Similar to above, in this example, the processing lanes are to perform the XOR shuffle where the values from the Rx register of the source processing lane are stored in the Ry register of the destination processing lane, but with the offset equal to 2. This operation is illustrated in FIG. 5 with the shuffle XOR offset=2. The ALUs of the processing lanes may then preform the following operation: add.f32 Rx, Ry, Rx. In this example, the ALUs of the processing lanes each add the value in respective Rx registers with values from respective Ry registers and store the result in respective Rx registers. In this example, the Ry register stores the value of the sum of two processing lanes and the Rx register, prior to execution of the operation, stores the value of the sum of two processing lanes. Therefore, after execution of the summing instruction, the resulting value stored in the respective Rx registers is the sum of four processing lanes (again, this process is occurring in each processing lane).

Each processing lane may then perform the following operation: shfl.bfly.b32 Ry, Rx, 0x1. Similar to above, in this example, the processing lanes are to perform the XOR shuffle where the values from the Rx register of the source processing lane are stored in the Ry register of the destination processing lane, but with the offset equal to 1. This operation is illustrated in FIG. 5 with the shuffle XOR offset=1. The ALUs of the processing lanes may then perform the following operation: add.f32 Rx, Ry, Rx. In this example, the ALUs of the processing lanes each add the value in respective Rx registers with values from respective Ry registers and store the result in respective Rx registers. In this example, the Ry register stores the value of the sum of four processing lanes and the Rx register, prior to execution of the operation, stores the value of the sum of four processing lanes. Therefore, after execution of the summing instruction, the resulting value stored in the respective Rx registers is the sum of eight processing lanes (again, this process is occurring in each processing lane).

In the end, each of the Rx registers of each of the processing lanes may store the same value indicative of the sum of the data from each of the processing lanes. In this example, the shuffle operation may allow for summation of data across all processing lanes. In accordance with the techniques described in this disclosure, shuffler circuit 14 may facilitate this shuffle to allow for this summation without the need for expensive all-lane to all-lane crossbar, but instead of a much smaller cross bar within shuffler circuit 14 (e.g., 8×8 cross bar).

The following is pseudo-code for performing the example illustrated in FIG. 5.

Usage Example:

```
// 32-bit XOR reduction of 32-fibers
    shfl.xor.u32 Ry, Rx, 16;
(ss) add.f32 Rx, Ry, Rx;
    shfl.xor.u32 Ry, Rx, 8;
(ss) add.f32 Rx, Ry, Rx;
    shfl.xor.u32 Ry, Rx, 4;
(ss) add.f32 Rx, Ry, Rx;
    shfl.xor.u32 Ry, Rx, 2;
(ss) add.f32 Rx, Ry, Rx;
    shfl.xor.u32 Ry, Rx, 1;
(ss) add.f32 Rx, Ry, Rx;
// All fibers now hold sum in Rx
```

Figure 6:
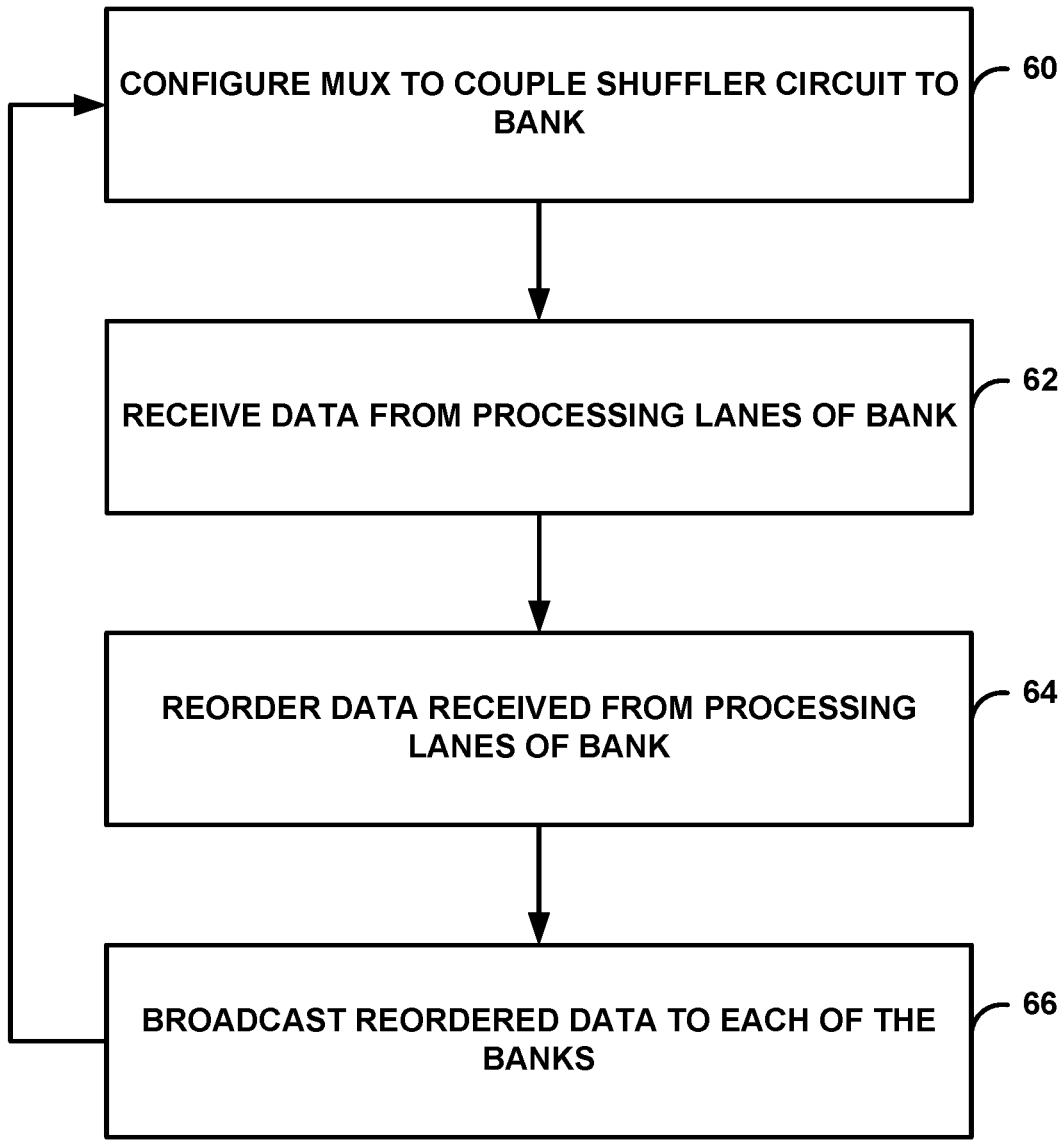
FIG. 6 is a flowchart illustrating an example method of processing data.

FIG. 6 is a flowchart illustrating an example method of processing data. For example, FIG. 6 illustrates an example for performing a shuffle operation. Controller circuit 38 configures MUX 48 to couple input ports of shuffler circuit 14 to respective processing lanes of a bank (60). In this way, shuffler circuit 14 may receive data from a source subset of the processing lanes as one example (62). For example, shuffler circuit 14 may receive data from only one bank.

Shuffler circuit 14 may reorder the data received from the processing lanes of the bank responsive to an instruction instructing at least some of the processing lanes (e.g., each of the processing lanes or a subset of the processing lanes) to output data to another one of the processing lanes (e.g., responsive to a shuffle instruction) (64). For example, controller circuit 38 may determine a bank identification for one of the plurality of banks and a lane identification of a processing lane with a bank having the determined bank identification based on an offset. Controller circuit 38 may cause the switches of shuffler circuit 14 to interconnect such that the first input port of shuffler circuit 14 outputs to the output port of shuffler circuit 14 that outputs to the processing lane having the determined lane identification in the determine bank. Controller circuit 38 may divide the offset with a number of input or output ports in shuffler circuit 14. The remainder and the shuffle mode may indicate to controller circuit 38 how right or left to shift the data on the input ports. Controller circuit 38 causes the switches of shuffler circuit 14 to interconnect the input ports to the output ports that are a remainder number of ports away (e.g., if the remainder is three, then the first input port outputs to the fourth output port).

DEMUX 54 broadcasts the reordered output from shuffler circuit 14 to each of the banks (66). In this way, shuffler circuit 14 outputs the reordered data to the processing lanes. However, not all of the processing lanes may store the received data. For example, a destination subset of the processing lanes (e.g., less than all processing lanes) may store the reordered data in corresponding registers. In some examples, controller circuit 38 may allow the corresponding registers of the destination subsets of the processing lanes to store the reordered data. Controller circuit 38 may determine which corresponding GPRs of the processing lanes to allow storing based on the offset and the lane identification of the processing lane that receives the output from the first input port of the shuffler circuit 14.

Controller circuit 38 and shuffler circuit 14 may repeat these operations until the shuffle operation is complete. For example, shuffler circuit 14 may receive data from successive source subsets of the processing lanes (e.g., MUX 48 may couple the processing lanes of the successive bank to the input of shuffler circuit 14). Shuffler circuit 14 may reorder the data received form the successive source subsets (e.g., shift the data on in the input ports to the output ports based on the remainder of the division of the offset with the number of ports of shuffler circuit 14). Shuffler circuit 14 may output the reordered data to the processing lanes, where successive destination subsets of the processing lanes store the received reordered data in corresponding registers.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for processing data, the device comprising:
a plurality of processing lanes, each of the processing lanes comprising circuitry to process the data, wherein the processing lanes are configured in a single instruction multiple data (SIMD) structure, and wherein the processing lanes are grouped into a plurality of banks, each bank of the plurality of banks comprises one or more processing lanes of the plurality of processing lanes; and
a shuffler circuit comprising a plurality of input ports and a plurality of output ports, wherein each output port of the plurality of output ports is configured to output to only one processing lane in each bank of the plurality of banks, and wherein the shuffler circuit is configured to:
in a first iteration, receive data, on the input ports, including entire scalar or vector values from each processing lane of only a source subset of the processing lanes, wherein the source subset of the processing lanes is fewer processing lanes than the plurality of processing lanes, wherein a first processing lane of the source subset of the processing lanes is associated with first data, wherein a second processing lane of the source subset of the processing lanes is associated with second data, and wherein an order of the data is based on relative positions of the first processing lane and the second processing lane in a bank of the plurality of banks that includes the first processing lane and the second processing lane such that in the order of the data the second data follows the first data;
in the first iteration, reorder the data including the entire scalar or vector values received from the source subset of the processing lanes responsive to an instruction instructing each of the processing lanes to output data to another one of the processing lanes based on the relative positions of the first and second processing lanes and the instruction instructing to which processing lanes each of the processing lanes are to output data such that the second data does not follow the first data and the second data is in the reordered data; and in the first iteration, output the reordered data including the entire scalar or vector values respectively to all of the processing lanes, wherein a destination subset of the processing lanes stores the reordered data in corresponding registers, wherein the destination subset of the processing lanes is fewer than the plurality of processing lanes, wherein processing lanes other than the destination subset of the processing lanes discard the reordered data that is received by the processing lanes other than the destination subset of the processing lanes, wherein to output the reordered data, the shuffler circuit is configured to output the reordered data to each of the plurality of banks, and wherein to output the reordered data to each of the plurality of banks, each output port of the plurality of output ports only outputs to respective processing lanes of each bank of the plurality of banks, wherein the shuffler circuit is further configured to:

in each iteration of multiple iterations following the first iteration, receive data from only a successive source subset of the processing lanes;

in each iteration of the multiple iterations, reorder the data received from the successive source subset of the processing lanes to generate successive reordered data responsive to the instruction instructing each of the processing lanes to output data to another one of the processing lanes; and in each iteration of the multiple iterations, output the successive reordered data to all of the processing lanes, and wherein successive destination subsets of the processing lanes store the successive reordered data in corresponding registers.

2. The device of claim 1, further comprising:
a controller circuit configured to allow the corresponding registers of the destination subset of the processing lanes to store the reordered data.

3. The device of claim 2, wherein the controller circuit is configured to determine a bank identification for one of the plurality of banks and a lane identification of a processing lane within one of the banks having the determined bank identification based on an offset, and the controller circuit is configured to allow the corresponding registers of the destination subset of the processing lanes to store the reordered data based on the determined bank identification and lane identification.

4. The device of claim 1, wherein to receive data from the source subset, the shuffler circuit is configured to receive data from only one bank.

5. The device of claim 1, wherein the shuffler circuit is configured to reorder the data based on an offset defined by the instruction.

6. The device of claim 1, further comprising:
a multiplexer coupled to each of the banks and an input interface of the shuffler circuit;
a controller circuit configured to selectively couple the bank of the plurality of banks that includes the source subset of the processing lanes to the shuffler circuit via the multiplexer; and
a demultiplexer coupled to each of the banks and an output interface of the shuffler, wherein the demultiplexer is configured to broadcast the reordered data to the banks, wherein each output of the demultiplexer outputs to only one processing lane in each bank of the plurality of banks.

7. The device of claim 1, further comprising a graphics processing unit (GPU), wherein the GPU comprises the plurality of processing lanes.

8. The device of claim 1, wherein the device comprises one of:
an integrated circuit;
a microprocessor; or
a wireless communication device.

9. A method of processing data, the method comprising:
in a first iteration, receiving, with input ports of a shuffler circuit, data including entire scalar or vector values from each processing lane of only a source subset of processing lanes of a plurality of processing lanes, each of the processing lanes comprising circuitry to process the data, wherein the processing lanes are configured in a single instruction multiple data (SIMD) structure, wherein the processing lanes are grouped into a plurality of banks, each bank of the plurality of banks comprises one or more processing lanes of the plurality of processing lanes, wherein the source subset of the processing lanes is fewer processing lanes than the plurality of processing lanes, wherein a first processing lane of the source subset of the processing lanes is associated with first data, wherein a second processing lane of the source subset of the processing lanes is associated with second data, and wherein an order of the data is based on relative positions of the first processing lane and the second processing lane in a bank of the plurality of banks that includes the first processing lane and the second processing lane such that in the order of the data the second data follows the first data;

in the first iteration, reordering, with the shuffler circuit, the data including the entire scalar or vector values received from the source subset of the processing lanes responsive to an instruction instructing each of the processing lanes to output data to another one of the processing lanes based on the relative positions of the first and second processing lanes and the instruction instructing to which processing lanes each of the processing lanes are to output data such that the second data does not follow the first data and the second data is in the reordered data; and in the first iteration, outputting, with a plurality output ports of the shuffler circuit, the reordered data including the entire scalar or vector values respectively to all of the processing lanes, wherein each output port of the plurality of output ports is configured to output to only one processing lane in each bank of the plurality of banks, wherein a destination subset of the processing lanes stores the reordered data in corresponding registers, wherein the destination subset of the processing lanes is fewer than the plurality of processing lanes, wherein processing lanes other than the destination subset of the processing lanes discard the reordered data that is received by the processing lanes other than the destination subset of the processing lanes, wherein outputting the reordered data comprises outputting the reordered data to each of the plurality of banks, and wherein outputting the reordered data to each of the plurality of banks comprises each output port of the plurality of output ports only outputting to respective processing lanes of each bank of the plurality of banks, the method further comprising:

in each iteration of multiple iterations following the first iteration, receiving data from only a successive source subset of the processing lanes;

in each iteration of the multiple iterations, reordering the data received from the successive source subset of the processing lanes to generate successive reordered data responsive to the instruction instructing each of the processing lanes to output data to another one of the processing lanes; and in each iteration of the multiple iterations, outputting the successive reordered data to all of the processing lanes, and wherein successive destination subsets of the processing lanes store the successive reordered data in corresponding registers.

10. The method of claim 9, further comprising:

allowing, with a controller circuit, the corresponding registers of the destination subset of the processing lanes to store the reordered data.

11. The method of claim 10, further comprising:

determining, with the controller circuit, a bank identification for one of the plurality of banks and a lane identification of a processing lane within one of the banks having the determined bank identification based on an offset, wherein allowing the corresponding registers to store comprises allowing the corresponding registers of the destination subset of the processing lanes to store the reordered data based on the determined bank identification and lane identification.

12. The method of claim 9, wherein receiving data from the source subset comprises receiving data from only one bank.

13. The method of claim 9, wherein reordering comprises reordering the data based on an offset defined by the instruction.

14. The method of claim 9, further comprising:

selectively coupling the bank of the plurality of banks that includes the source subset of the processing lanes to the shuffler circuit via a multiplexer; and broadcasting via a demultiplexer the reordered data to the banks, wherein each output of the demultiplexer outputs to only one processing lane in each bank of the plurality of banks.

15. A device for processing data, the device comprising:

means for receiving, in a first iteration, data, via input porst, including entire scalar or vector values from each processing lane of only a source subset of processing lanes of a plurality of processing lanes, each of the processing lanes comprising circuitry to process the data, wherein the processing lanes are configured in a single instruction multiple data (SIMD) structure, wherein the processing lanes are grouped into a plurality of banks, each bank of the plurality of banks comprises one or more processing lanes of the plurality of processing lanes, wherein the source subset of processing lanes is fewer processing lanes than the plurality of processing lanes, wherein a first processing lane of the source subset of the processing lanes is associated with first data, wherein a second processing lane of the source subset of the processing lanes is associated with second data, and wherein an order of the data is based on relative positions of the first processing lane and the second processing lane in a bank of the plurality of banks that includes the first processing lane and the second processing lane such that in the order of the data the second data follows the first data;

means for reordering, in the first iteration, the data including the entire scalar or vector values received from the source subset of the processing lanes responsive to an instruction instructing each of the processing lanes to output data to another one of the processing lanes based on the relative positions of the first and second processing lanes and the instruction instructing to which processing lanes each of the processing lanes are to output data such that the second data does not follow the first data and the second data is in the reordered data; and means for outputting, in the first iteration, the reordered data, with a plurality of ports, including the entire scalar or vector values respectively to all of the processing lanes, wherein each output port of the plurality of output ports is configured to output to only one processing lane in each bank of the plurality of banks, wherein a destination subset of the processing lanes stores the reordered data in corresponding registers, wherein the destination subset of the processing lanes is fewer than the plurality of processing lanes, wherein processing lanes other than the destination subset of the processing lanes discard the reordered data that is received by the processing lanes other than the destination subset of the processing lanes, wherein the means for outputting the reordered data comprises means for outputting the reordered data to each of the plurality of banks, and wherein the means for outputting the reordered data to each of the plurality of banks comprises means for each output port of the plurality of output ports only outputting to respective processing lanes of each bank of the plurality of banks, the device further comprising:

means for receiving, in each iteration of multiple iterations following the first iteration, data from only a successive source subset of the processing lanes;

means for reordering, in each iteration of the multiple iterations following the first iteration, the data received from the successive source subset of the processing lanes to generate successive reordered data responsive to the instruction instructing each of the processing lanes to output data to another one of the processing lanes; and means for outputting, in each iteration of the multiple iterations following the first iteration, the successive reordered data to all of the processing lanes, and wherein successive destination subsets of the processing lanes store the successive reordered data in corresponding registers.

16. The device of claim 15, further comprising:

means for allowing the corresponding registers of the destination subset of the processing lanes to store the reordered data.

17. The device of claim 16, further comprising:

means for determining a bank identification for one of the plurality of banks and a lane identification of a processing lane within one of the banks having the determined bank identification based on an offset, wherein the means for allowing the corresponding registers to store comprises means for allowing the corresponding registers of the destination subset of the processing lanes to store the reordered data based on the determined bank identification and lane identification.

18. The device of claim 15, wherein the means for receiving data from the source subset comprises means for receiving data from only one bank.

19. The device of claim 15, wherein the means for reordering comprises means for reordering the data based on an offset defined by the instruction.

20. The device of claim 15, further comprising a graphics processing unit (GPU), wherein the GPU comprises the plurality of processing lanes.

21. The device of claim 15, wherein the device comprises one of:
an integrated circuit;
a microprocessor; or
a wireless communication device.

22. A computer-readable storage medium comprising instructions that when executed cause a shuffler circuit of a device for processing data to:
in a first iteration, receive, with input ports of the shuffler circuit, data including entire scalar or vector values from each processing lane of only a source subset of processing lanes of a plurality of processing lanes, each of the processing lanes comprising circuitry to process the data, wherein the processing lanes are configured in a single instruction multiple data (SIMD) structure, wherein the processing lanes are grouped into a plurality of banks, each bank of the plurality of banks comprises one or more processing lanes of the plurality of processing lanes, wherein the source subset of the processing lanes is fewer processing lanes than the plurality of processing lanes, wherein a first processing lane of the source subset of the processing lanes is associated with first data, wherein a second processing lane of the source subset of the processing lanes is associated with second data, and wherein an order of the data is based on relative positions of the first processing lane and the second processing lane in a bank of the plurality of banks that includes the first processing lane and the second processing lane such that in the order of the data the second data follows the first data;
in the first iteration, reorder the data including the entire scalar or vector values received from the source subset of the processing lanes responsive to an instruction instructing each of the processing lanes to output data to another one of the processing lanes based on the relative positions of the first and second processing lanes and the instruction instructing to which processing lanes each of the processing lanes are to output data such that the second data does not follow the first data and the second data is in the reordered data; and
in the first iteration, output, with a plurality of output ports of the shuffler circuit, the reordered data including the entire scalar or vector values respectively to all of the processing lanes, wherein each output port of the plurality of output ports is configured to output to only one processing lane in each bank of the plurality of banks, wherein a destination subset of the processing lanes stores the reordered data in corresponding registers, wherein the destination subset of the processing lanes is fewer than the plurality of processing lanes, wherein processing lanes other than the destination subset of the processing lanes discard the reordered data that is received by the processing lanes other than the destination subset of the processing lanes, wherein the instructions that cause the shuffler circuit to output the reordered data comprise instructions that cause the shuffler circuit to output the reordered data to each of the plurality of banks, and wherein the instructions that cause the shuffler circuit o output the reordered data to each of the plurality of banks comprises instructions that cause each output port of the plurality of output ports to only output to respective processing lanes of each bank of the plurality of banks, the instructions further comprising instructions that cause the shuffler circuit to:
in each iteration of multiple iterations following the first iteration, receive data from only a successive source subset of the processing lanes;
in each iteration of the multiple iterations, reorder the data received from the successive source subset of the processing lanes to generate successive reordered data responsive to the instruction instructing each of the processing lanes to output data to another one of the processing lanes; and
in each iteration of the multiple iterations, output the successive reordered data to all of the processing lanes, and wherein successive destination subsets of the processing lanes store the successive reordered data in corresponding registers.

23. The computer-readable storage medium of claim 22, further comprising instructions that cause the one or more circuits to:
allow the corresponding registers of the destination subset of the processing lanes to store the reordered data.

* * * * *